(12) United States Patent
Singh et al.

(10) Patent No.: US 9,531,808 B2
(45) Date of Patent: Dec. 27, 2016

(54) PROVIDING DATA RESOURCE SERVICES WITHIN ENTERPRISE SYSTEMS FOR RESOURCE LEVEL SHARING AMONG MULTIPLE APPLICATIONS, AND RELATED METHODS, SYSTEMS, AND COMPUTER-READABLE MEDIA

(71) Applicant: Avaya Inc., Basking Ridge, NJ (US)

(72) Inventors: Kundan Singh, San Francisco, CA (US); Venkatesh Krishnaswamy, Holmdel, NJ (US)

(73) Assignee: Avaya Inc., Basking Ridge, NJ (US)

( * ) Notice: Subject to any disclaimer, the term of this patent is extended or adjusted under 35 U.S.C. 154(b) by 271 days.

(21) Appl. No.: 14/174,371

(22) Filed: Feb. 6, 2014

(65) Prior Publication Data
US 2015/0058418 A1 Feb. 26, 2015

Related U.S. Application Data

(60) Provisional application No. 61/868,603, filed on Aug. 22, 2013.

(51) Int. Cl.
*H04L 29/08* (2006.01)
*G06F 21/62* (2013.01)
*H04L 29/06* (2006.01)

(52) U.S. Cl.
CPC ....... *H04L 67/1097* (2013.01); *G06F 21/6218* (2013.01); *H04L 63/20* (2013.01); *H04L 67/02* (2013.01)

(58) Field of Classification Search
None
See application file for complete search history.

(56) References Cited

U.S. PATENT DOCUMENTS 5,696,961 A 12/1997 Briscoe et al.
6,714,967 B1 3/2004 Horvitz
(Continued)

FOREIGN PATENT DOCUMENTS

EP 1615386 A1 1/2006
EP 2529316 A2 12/2012
(Continued)

OTHER PUBLICATIONS

Rodriguez, Pedro et al., "Advanced Videoconferencing Services Based on WebRTC," IADIS International Conferences Web Based Communities and Social Media 2012 and Collaborative Technologies 2012, Jul. 17-23, 2012, pp. 180-184, http://www.iadisportal.org/wbc-2012-proceedings.
(Continued)

*Primary Examiner* — Ninos Donabed
(74) *Attorney, Agent, or Firm* — Sheridan Ross P.C.

(57) ABSTRACT

Providing data resource services within enterprise systems for resource level sharing among multiple applications, and related methods, systems, and computer-readable media are disclosed. In one embodiment, a method for providing a data resource service within an enterprise system is provided. The method includes receiving a user data request from a web application having application logic located outside of an enterprise system to access user data stored in memory within the enterprise system. The method further includes accessing the user data stored in the memory within the enterprise system in response to the user data request from the web application. The method also includes providing access to the user data stored in the memory within the enterprise system to the web application in response to the user data request.

23 Claims, 11 Drawing Sheets

(56) References Cited

U.S. PATENT DOCUMENTS

| | | | |
|---|---|---|---|
| 7,002,973 B2* | 2/2006 | MeLampy | H04L 29/06027 370/392 |
| 7,028,092 B2* | 4/2006 | MeLampy | H04L 29/06027 370/392 |
| 7,072,303 B2* | 7/2006 | MeLampy | H04L 29/06027 370/238 |
| 7,107,316 B2 | 9/2006 | Brown et al. | |
| 7,145,898 B1 | 12/2006 | Elliott | |
| 7,266,591 B1 | 9/2007 | Johnston | |
| 7,379,934 B1 | 5/2008 | Forman et al. | |
| 7,379,993 B2 | 5/2008 | Valdes et al. | |
| 7,636,348 B2 | 12/2009 | Bettis et al. | |
| 7,730,309 B2 | 6/2010 | Zimmermann | |
| 8,015,484 B2 | 9/2011 | Backer | |
| 8,250,635 B2 | 8/2012 | Chari et al. | |
| 8,300,632 B2 | 10/2012 | Davis et al. | |
| 8,467,308 B2 | 6/2013 | Johnston | |
| 8,494,507 B1 | 7/2013 | Tedesco et al. | |
| 8,601,144 B1 | 12/2013 | Ryner | |
| 8,605,711 B1 | 12/2013 | Sinnreich et al. | |
| 8,606,950 B2 | 12/2013 | Glatron et al. | |
| 8,693,392 B2 | 4/2014 | Cooper et al. | |
| 8,695,077 B1 | 4/2014 | Gerhard et al. | |
| 8,737,596 B2 | 5/2014 | Kelley et al. | |
| 8,744,147 B2 | 6/2014 | Torti | |
| 8,832,271 B2 | 9/2014 | McCarty | |
| 8,856,236 B2 | 10/2014 | Moore et al. | |
| 8,861,692 B1 | 10/2014 | Phelps et al. | |
| 8,867,731 B2 | 10/2014 | Lum et al. | |
| 2002/0091702 A1 | 7/2002 | Mullins | |
| 2002/0161685 A1 | 10/2002 | Dwinnell | |
| 2003/0112766 A1 | 6/2003 | Riedel et al. | |
| 2003/0120599 A1* | 6/2003 | Agboatwalla | G06F 17/30873 705/50 |
| 2003/0131245 A1 | 7/2003 | Linderman | |
| 2003/0167398 A1* | 9/2003 | Sueyoshi | G06F 8/71 713/189 |
| 2003/0188193 A1 | 10/2003 | Venkataramappa | |
| 2004/0019494 A1* | 1/2004 | Ridgeway | G06Q 10/0637 705/26.1 |
| 2004/0081173 A1* | 4/2004 | Feather | H04L 29/06 370/395.54 |
| 2004/0093515 A1 | 5/2004 | Reeves, Jr. | |
| 2004/0167984 A1 | 8/2004 | Herrmann | |
| 2004/0216173 A1 | 10/2004 | Horoszowski et al. | |
| 2005/0084082 A1 | 4/2005 | Horvitz et al. | |
| 2005/0177380 A1 | 8/2005 | Pritchard et al. | |
| 2006/0080257 A1* | 4/2006 | Vaughan | G06Q 10/10 705/51 |
| 2006/0104526 A1 | 5/2006 | Gringeler et al. | |
| 2006/0155814 A1 | 7/2006 | Bennett et al. | |
| 2006/0159063 A1 | 7/2006 | Kumar | |
| 2006/0200468 A1 | 9/2006 | Brown et al. | |
| 2006/0200855 A1 | 9/2006 | Willis | |
| 2006/0230438 A1 | 10/2006 | Shappir et al. | |
| 2007/0073699 A1* | 3/2007 | Reed | G06F 21/604 |
| 2007/0083929 A1 | 4/2007 | Sprosts et al. | |
| 2007/0143408 A1 | 6/2007 | Daigle | |
| 2007/0203922 A1 | 8/2007 | Thomas | |
| 2007/0255662 A1 | 11/2007 | Tumminaro | |
| 2007/0283423 A1 | 12/2007 | Bradley et al. | |
| 2008/0046414 A1* | 2/2008 | Haub | G06F 17/30312 |
| 2008/0046457 A1* | 2/2008 | Haub | G06F 17/30997 |
| 2008/0046838 A1* | 2/2008 | Haub | G06F 17/30997 715/810 |
| 2008/0127137 A1* | 5/2008 | Becker | G06F 9/547 717/140 |
| 2008/0162642 A1 | 7/2008 | Bachiri et al. | |
| 2008/0192646 A1 | 8/2008 | Song et al. | |
| 2008/0270541 A1 | 10/2008 | Keener et al. | |
| 2009/0070477 A1 | 3/2009 | Baum et al. | |
| 2009/0094684 A1 | 4/2009 | Chinnusamy et al. | |
| 2009/0300060 A1* | 12/2009 | Beringer | G06F 8/24 |
| 2010/0011282 A1* | 1/2010 | Dollard | G06F 17/241 715/233 |
| 2010/0023519 A1* | 1/2010 | Kailash | H04L 63/10 707/E17.007 |
| 2010/0024019 A1* | 1/2010 | Backlund | G06F 21/335 726/7 |
| 2010/0037324 A1* | 2/2010 | Grant | G06F 21/554 726/27 |
| 2010/0118700 A1 | 5/2010 | Blum et al. | |
| 2010/0246571 A1 | 9/2010 | Geppert et al. | |
| 2011/0102930 A1 | 5/2011 | Johnston et al. | |
| 2011/0206013 A1 | 8/2011 | Aramoto et al. | |
| 2011/0238862 A1 | 9/2011 | Chaturvedi et al. | |
| 2012/0001932 A1 | 1/2012 | Burnett et al. | |
| 2012/0079031 A1 | 3/2012 | Matthews et al. | |
| 2012/0137231 A1 | 5/2012 | Maxfield et al. | |
| 2012/0158862 A1 | 6/2012 | Mosko et al. | |
| 2012/0192086 A1 | 7/2012 | Ghods et al. | |
| 2013/0002799 A1 | 1/2013 | Mock | |
| 2013/0073387 A1* | 3/2013 | Heath | G06Q 50/01 705/14.53 |
| 2013/0073389 A1* | 3/2013 | Heath | G06Q 50/01 705/14.54 |
| 2013/0073400 A1* | 3/2013 | Heath | G06Q 30/02 705/14.73 |
| 2013/0073473 A1* | 3/2013 | Heath | G06Q 30/02 705/319 |
| 2013/0078972 A1 | 3/2013 | Levien et al. | |
| 2013/0091286 A1 | 4/2013 | Spencer | |
| 2013/0124972 A1* | 5/2013 | Le Chevalier | G06F 21/10 715/234 |
| 2013/0138829 A1 | 5/2013 | Bulava | |
| 2013/0139053 A1* | 5/2013 | Le Chevalier | G06Q 30/0601 715/255 |
| 2013/0145419 A1* | 6/2013 | Hu | G06Q 10/063 726/1 |
| 2013/0321340 A1 | 12/2013 | Seo et al. | |
| 2013/0325934 A1* | 12/2013 | Fausak | H04L 29/0809 709/203 |
| 2013/0346329 A1* | 12/2013 | Alib-Bulatao | G06Q 10/06 705/319 |
| 2014/0013202 A1 | 1/2014 | Schlumberger | |
| 2014/0043994 A1 | 2/2014 | Bansal et al. | |
| 2014/0095633 A1 | 4/2014 | Yoakum | |
| 2014/0095724 A1 | 4/2014 | Yoakum et al. | |
| 2014/0095731 A1 | 4/2014 | Carey et al. | |
| 2014/0108594 A1 | 4/2014 | Siegel et al. | |
| 2014/0126708 A1 | 5/2014 | Sayko | |
| 2014/0126714 A1 | 5/2014 | Sayko | |
| 2014/0126715 A1 | 5/2014 | Lum et al. | |
| 2014/0143823 A1 | 5/2014 | Manchester et al. | |
| 2014/0149512 A1* | 5/2014 | Leitch | H04L 67/1061 709/204 |
| 2014/0161237 A1 | 6/2014 | Tolksdorf | |
| 2014/0201820 A1 | 7/2014 | Li et al. | |
| 2014/0219167 A1* | 8/2014 | Santhanam | H04W 28/0268 370/328 |
| 2014/0222894 A1 | 8/2014 | Gangadharan et al. | |
| 2014/0222930 A1 | 8/2014 | Gangadharan et al. | |
| 2014/0223452 A1 | 8/2014 | Santhanam et al. | |
| 2014/0237057 A1 | 8/2014 | Khodorenko | |
| 2014/0241215 A1 | 8/2014 | Massover et al. | |
| 2014/0244235 A1 | 8/2014 | Michaelis | |
| 2014/0245143 A1 | 8/2014 | Saint-Marc | |
| 2014/0258822 A1 | 9/2014 | Li et al. | |
| 2014/0269326 A1 | 9/2014 | Westin et al. | |
| 2014/0270104 A1 | 9/2014 | O'Connor | |
| 2014/0280734 A1 | 9/2014 | Chaturvedi et al. | |
| 2014/0282054 A1 | 9/2014 | Yoakum | |
| 2014/0282135 A1 | 9/2014 | Segre | |
| 2014/0282399 A1 | 9/2014 | Gorelik et al. | |
| 2014/0282765 A1 | 9/2014 | Casey et al. | |
| 2014/0282903 A1 | 9/2014 | Singh et al. | |
| 2014/0324979 A1 | 10/2014 | Gao et al. | |
| 2014/0325078 A1 | 10/2014 | Shan et al. | |
| 2014/0344169 A1 | 11/2014 | Phelps et al. | |
| 2014/0348044 A1 | 11/2014 | Narayanan et al. | |
| 2014/0365676 A1 | 12/2014 | Yoakum | |

(56) References Cited

U.S. PATENT DOCUMENTS

| | | | |
|---|---|---|---|
| 2014/0379634 A1 | 12/2014 | Yoakum et al. | |
| 2014/0379931 A1 | 12/2014 | Gaviria | |
| 2015/0002614 A1* | 1/2015 | Zino | H04N 7/148 348/14.08 |
| 2015/0002619 A1 | 1/2015 | Johnston et al. | |
| 2015/0006610 A1 | 1/2015 | Johnston et al. | |
| 2015/0006611 A1 | 1/2015 | Johnston et al. | |
| 2015/0026473 A1 | 1/2015 | Johnston et al. | |
| 2015/0036690 A1 | 2/2015 | Pastro | |
| 2015/0039687 A1 | 2/2015 | Waxman et al. | |
| 2015/0039760 A1 | 2/2015 | Yoakum | |
| 2015/0052067 A1 | 2/2015 | Thiyagarajan et al. | |
| 2015/0180825 A1 | 6/2015 | Ren et al. | |

FOREIGN PATENT DOCUMENTS

| | | |
|---|---|---|
| GB | 2295747 A | 6/1996 |
| GB | 2468758 A | 9/2010 |
| GB | 2468759 A | 9/2010 |
| GB | 2517833 A | 3/2015 |
| JP | 2002207683 A | 7/2002 |
| JP | 2002374318 A | 12/2002 |
| JP | 2005346556 A | 12/2005 |
| JP | 2006050407 A | 2/2006 |
| JP | 2011504665 A | 2/2011 |
| WO | 2014060008 A1 | 4/2014 |
| WO | 2014123738 A1 | 8/2014 |
| WO | 2014190094 A1 | 11/2014 |
| WO | 2015032277 A1 | 3/2015 |

OTHER PUBLICATIONS

Examination Report for British Patent Application GB1411584.4, mailed Aug. 21, 2015, 1 page.
Examination Report for British Patent Application GB1411580.2, mailed Aug. 21, 2015, 1 page.
Notification of Reasons for Refusal for Japanese Patent Application 2013-201221, mailed Aug. 25, 2015, 8 pages.
Non-Final Office Action for U.S. Appl. No. 13/835,913, mailed Sep. 3, 2015, 19 pages.
Non-Final Office Action for U.S. Appl. No. 13/912,520, mailed Sep. 9, 2015, 21 pages.
Non-Final Office Action for U.S. Appl. No. 13/863,662, mailed Sep. 25, 2015, 23 pages.
Advisory Action for U.S. Appl. No. 13/803,292, mailed Aug. 21, 2015, 3 pages.
Non-Final Office Action for U.S. Appl. No. 13/803,292, mailed Oct. 9, 2015, 13 pages.
Advisory Action and Examiner-Initiated Interview Summary for U.S. Appl. No. 14/050,891, mailed Sep. 29, 2015, 4 pages.
Final Office Action for U.S. Appl. No. 14/068,839, mailed Sep. 9, 2015, 17 pages.
Final Office Action for U.S. Appl. No. 13/931,967, mailed Aug. 20, 2015, 12 pages.
Final Office Action for U.S. Appl. No. 13/931,970, mailed Aug. 27, 2015, 10 pages.
Non-Final Office Action for U.S. Appl. No. 13/955,711, mailed Nov. 9, 2015, 10 pages.
Notice of Allowance for U.S. Appl. No. 14/050,891, mailed Nov. 10, 2015, 10 pages.
Non-Final Office Action for U.S. Appl. No. 13/955,023, mailed Dec. 9, 2015, 13 pages.
Non-Final Office Action for U.S. Appl. No. 14/037,440, mailed Oct. 22, 2015, 15 pages.
Advisory Action for U.S. Appl. No. 13/931,967, mailed Nov. 3, 2015, 3 pages.
Advisory Action for U.S. Appl. No. 13/931,970, mailed Nov. 5, 2015, 3 pages.
Non-Final Office Action for U.S. Appl. No. 14/068,943, mailed Dec. 2, 2015, 16 pages.
Non-Final Office Action for U.S. Appl. No. 14/255,429, mailed Nov. 9, 2015, 26 pages.
Advisory Action for U.S. Appl. No. 13/923,748, mailed Oct. 28, 2015, 3 pages.
Non-Final Office Action for U.S. Appl. No. 13/923,748, mailed Dec. 18, 2015, 11 pages.
Search Report for British Patent Application No. GB1423089.0, mailed Jul. 6, 2015, 4 pages.
U.S. Appl. No. 13/803,292, filed Mar. 14, 2013.
U.S. Appl. No. 13/863,662, filed Apr. 16, 2013.
U.S. Appl. No. 13/835,913, filed Mar. 15, 2013.
U.S. Appl. No. 13/912,520, filed Jun. 7, 2013.
U.S. Appl. No. 13/955,711, filed Jul. 31, 2013.
U.S. Appl. No. 13/944,368, filed Jul. 17, 2013.
U.S. Appl. No. 13/931,967, filed Jun. 30, 2013.
U.S. Appl. No. 13/931,968, filed Jun. 30, 2013.
U.S. Appl. No. 13/931,970, filed Jun. 30, 2013.
U.S. Appl. No. 13/955,023, filed Jul. 31, 2013.
U.S. Appl. No. 14/071,896, filed Nov. 5, 2013.
U.S. Appl. No. 14/050,891, filed Oct. 10, 2013.
U.S. Appl. No. 14/037,440, filed Sep. 26, 2013.
U.S. Appl. No. 14/068,943, filed Oct. 31, 2013.
U.S. Appl. No. 14/255,361, filed Apr. 17, 2014.
U.S. Appl. No. 14/068,839, filed Oct. 31, 2013.
U.S. Appl. No. 14/141,798, filed Dec. 27, 2013.
U.S. Appl. No. 14/313,041, filed Jun. 24, 2014.
U.S. Appl. No. 14/255,429, filed Apr. 17, 2014.
Notice of Allowance for U.S. Appl. No. 13/931,968, mailed Mar. 23, 2015, 7 pages.
Final Office Action for U.S. Appl. No. 13/835,913, mailed Mar. 26, 2015, 17 pages.
Final Office Action for U.S. Appl. No. 14/037,440, mailed Feb. 11, 2015, 19 pages.
Non-Final Office Action for U.S. Appl. No. 14/068,839, mailed Feb. 20, 2015, 15 pages.
Non-Final Office Action for U.S. Appl. No. 13/923,748, mailed Feb. 12, 2015, 8 pages.
Barth, A. "The Web Origin Concept," Internet Engineering Task Force (IETF), Request for Comments 6454 (RFC 6454), Dec. 2011, 19 pages, http://www.ietf.org/rfc/rfc6454.txt.
Fischl, J. et al., "Framework for Establishing a Secure Real-time Transport Protocol (SRTP) Security Context Using Datagram Transport Layer Security (DTLS)," Internet Engineering Task Force (IETF), Request for Comments (RFC) 5763, May 2010, 26 pages.
Jesup, R. et al., "DTLS Encapsulation of SCTP Packets for Rtcweb," IETF: Network Working Group, Internet Draft, Feb. 16, 2013, 6 pages.
Johnston, A. et al., "An Origin Attribute for the STUN Protocol," Internet Engineering Task Force (IETF), Internet-Draft, Jul. 20, 2014, 14 pages, https://tools.ietf.org/html/draft-ietf-tram-stun-origin-00.
Rescorla, E., "Security Considerations for RTC-Web," IETF RTCWEB, Internet Draft, Jan. 22, 2013, 16 pages.
Rescorla, E., "WebRTC Security Architecture," IETF RTCWEB, Internet Draft, Jul. 14, 2013, 30 pages.
Corrected Notice of Allowability for U.S. Appl. No. 13/931,968, mailed Apr. 24, 2015, 4 pages.
Advisory Action for U.S. Appl. No. 14/037,440, mailed May 20, 2015, 3 pages.
Search Report for British Patent Application GB1419338.7, mailed Apr. 27, 2015, 4 pages.
Search Report for British Patent Application GB1419334.6, mailed Apr. 28, 2015, 6 pages.
Notice of Allowance for U.S. Appl. No. 13/944,368, mailed Apr. 1, 2015, 8 pages.
Non-Final Office Action for U.S. Appl. No. 13/931,967, mailed May 5, 2015, 10 pages.
Non-Final Office Action for U.S. Appl. No. 13/931,970, mailed May 7, 2015, 9 pages.
Bergkvist, Adam et al., "WebRTC 1.0: Real-time Communication Between Browsers," W3C Working Draft, Feb. 9, 2012, http://www.w3.org/TR/2012/WD-webrtc-20120209/, 42 pages.

(56) References Cited

OTHER PUBLICATIONS

Notice of Reason for Refusal for Japanese Patent Application 2013-201228, dispatched Jun. 11, 2015, 8 pages.
Advisory Action for U.S. Appl. No. 13/835,913, mailed Jun. 10, 2015, 3 pages.
Final Office Action for U.S. Appl. No. 13/803,292, mailed Jun. 12, 2015, 17 pages.
Final Office Action and Examiner Initiated Interview Summary for U.S. Appl. No. 14/050,891, mailed Jun. 29, 2015, 11 pages.
Final Office Action for U.S. Appl. No. 13/955,023, mailed Jul. 20, 2015, 17 pages.
Corrected Notice of Allowability for U.S. Appl. No. 13/944,368, mailed Jul. 23, 2015, 4 pages.
Non-Final Office Action for U.S. Appl. No. 14/141,798, mailed Jul. 17, 2015, 13 pages.
Final Office Action for U.S. Appl. No. 13/923,748, mailed Aug. 10, 2015, 11 pages.
Extended European Search Report for European Patent Application 15161452.6, mailed Jun. 23, 2015, 5 pages.
Andreasen et al., "Session Description Protocol (SDP): Security Descriptions for Media Streams," Network Working Group, Request for Comments: 4568, Standards Track, The Internet Society, Jul. 2006, 40 pages.
Baugher et al., "The Secure Real-time Transport Protocol (SRTP)," Network Working Group, Request for Comments: 3711, Standards Track, The Internet Society, Mar. 2004, 51 pages.
Johnston, Alan et al., "Taking on WebRTC in an Enterprise," IEEE Communications Magazine, Apr. 2013, pp. 48-54, vol. 51, Issue 4.
Johnston et al., "WebRTC: APIs and RTCWEB Protocols of the HTML5 Real-Time Web," (Book), Second Edition, Smashwords Edition, Digital Codex LLC, Jun. 2013, 254 pages.
Mahy et al., "Traversal Using Relays around NAT (TURN) : Relay Extensions to Session Traversal Utilities for NAT (STUN)," Internet Engineering Task Force, Request for Comments: 5766, Standards Track, IETF Trust, Apr. 2010, 61 pages.
McGrew et al., "Datagram Transport Layer Security (DTLS) Extension to Establish Keys for the Secure Real-Time Transport Protocol (SRTP)," Internet Engineering Task Force, Request for Comments: 5764, Standards Track, IETF Trust, May 2010, 24 pages.
Singh, Kundan et al., "Building Communicating Web Applications Leveraging Endpoints and Cloud Resource Service," Presented at the Sixth International Conference on Cloud Computing, Jun. 28, 2013, Santa Clara, California, IEEE Computer Society, pp. 486-493.
Singh, Kundan et al., "Private Overlay of Enterprise Social Data and Interactions in the Public Web Context," presented at the 9th IEEE International Conference on Collaborative Computing: Networking, Applications and Worksharing (Collaboratecom), Oct. 20-23, 2013, Austin, Texas, IEEE, 10 pages.
Zimmermann et al., "ZRTP: Media Path Key Agreement for Unicast Secure RTP," Internet Engineering Task Force, Request for Comments: 6189, Informational, IETF Trust, Apr. 2011, 102 pages.
Search Report for British patent application GB1317121.0 mailed Mar. 14, 2014, 3 pages.
Search Report for British patent application GB1317122.8 mailed Mar. 11, 2014, 3 pages.
Berners-Lee, Tim, "Socially Aware Cloud Storage," Notes on web design, Aug. 17, 2009, http://www.w3.org/DesignIssues/CloudStorage.html, 9 pages.
Chandra, Ramesh et al., "Separating Web Applications from User Data Storage with BStore," presented at the USENIX Conference on Web Application Development, Jun. 2010, Boston, Massachusettes, 13 pages.
Davids, Carol et al., "SIP APIs for Voice and Video Communications on the Web," presented at the International Conference on Principles, Systems and Applications of IP Telecommunications (IPTcomm), Aug. 2011, Chicago, Illinois, 7 pages.
Geambasu, Roxana et al., "Organizing and Sharing Distributed Personal Web-Service Data," presented at the International World Wide Web Conference, Apr. 21-25, 2008, Beijing, China, International World Wide Web Conference Committee, pp. 755-764.
Hsu, F. et al., "Secure File System Services for Web 2.0 Applications," presented at the ACM Cloud Computing Security Workshop, Nov. 13, 2009, Chicago, Illinois, Association for Computing Machinery, 7 pages.
Joshi, R., "Data-Oriented Architecture: A Loosley Coupled Real-Time SOA," Whitepaper, Aug. 2007, Real-Time Innovations, Inc., http://rtcgroup.com/whitepapers/files/RTI_DataOrientedArchitecture_WhitePaper.pdf, 54 pages.
Vahdat, Amin et al., "WebFS: A Global Cache Coherent File System," UC Berkeley, Dec. 1996, retrieved Sep. 16, 2014 from https://www.cs.duke.edu/~vahdat/webfs/webfs.html, 12 pages.
Non-Final Office Action for U.S. Appl. No. 14/037,440, mailed Sep. 12, 2014, 15 pages.
U.S. Appl. No. 13863,662, filed Apr. 16, 2013.
U.S. Appl. No. 13/923,748, filed Jun. 21, 2013.
Author Unknown, "WebRTC," WebRTC.org, Date Accessed: Jan. 26, 2016, 4 pages, http://webrtc.org/.
Notice of Allowance for U.S. Appl. No. 13/863,662, mailed Feb. 1, 2016, 17 pages.
Advisory Action and Examiner-Initiated Interview Summary for U.S. Appl. No. 14/068,839, mailed Feb. 12, 2016, 4 pages.
Final Office Action for U.S. Appl. No. 14/141,798, mailed Dec. 24, 2015, 10 pages.
Non-Final Office Action for U.S. Appl. No. 13/931,970, mailed Feb. 23, 2016, 11 pages.
Loreto, Salvatore et al., "Real-Time Communications in the Web: Issues, Achievements, and Ongoing Standardization Efforts," IEEE Internet Computing, vol. 16, Issue 5, IEEE Computer Society, Oct. 2, 2012, pp. 68-73.
Search Report for British patent application GB1411584.4 mailed Dec. 30, 2014, 4 pages.
Search Report for British patent application GB1411580.2 mailed Dec. 30, 2014, 4 pages.
Non-Final Office Action for U.S. Appl. No. 13/931,968, mailed Dec. 8, 2014, 6 pages.
Non-Final Office Action for U.S. Appl. No. 13/835,913, mailed Nov. 20, 2014, 15 pages.
Non-Final Office Action for U.S. Appl. No. 13/803,292, mailed Jan. 27, 2015, 13 pages.
Non-Final Office Action for U.S. Appl. No. 14/050,891, mailed Jan. 29, 2015, 9 pages.
Non-Final Office Action for U.S. Appl. No. 13/955,023, mailed Feb. 2, 2015, 12 pages.

* cited by examiner

| WIDGET NAME | PURPOSE |
|---|---|
| connector | CONNECT TO THE DATA RESOURCE SERVICE FOR DATA ACCESS AND EVENTS. MOST OTHERS INCLUDE A CONNECTOR. |
| video-io, audio-io | A VIDEO BOX TO PUBLISH OR PLAY A MEDIA STREAM. THE TWO WIDGETS SHARE MOST OF THE CODE. |
| phone | HEADLESS CALL SIGNALING/CALL STATE FOR TWO-PARTY CALL. |
| conference | HEADLESS CONTROL AND MEMBERSHIP MANAGEMENT FOR MULTIPARTY CONFERENCE. |
| click-to-call | A BUTTON TO INITIATE, ANSWER OR TERMINATE A CALL, AND INCLUDES A PHONE AND TWO AUDIO-IO WIDGETS. |
| click-to-join | A BUTTON TO JOIN OR LEAVE A CONFERENCE, AND INCLUDES A CONFERENCE WIDGET. |
| roster | A ROSTER DISPLAY OF PARTICIPANTS OR CONTACT LIST, AND ATTACHES TO CONFERENCE. |
| videos | A VIDEO CONFERENCE LAYOUT WHICH INCLUDES ZERO OR MORE VIDEO-IO, ONE PER PARTICIPANT. |
| conversation | A MULTIMEDIA CHAT BOX INCLUDES CONFERENCE, ROSTER, VIDEOS, TEXT-CHAT; ALSO HAS FILE-SHARING, EMOTICONS. |
| text-chat | A TEXT CHAT APPLICATION THAT INCLUDES TEXT-FEED AND CAN ATTACH TO CONFERENCE OR PHONE. |
| text-feed | A LIST DISPLAY OF A DYNAMIC ARRAY RESOURCE OF TEXT MESSAGES OR COMMENTS. |
| text-input | A USER INPUT CONTROL TO SET OR INDICATE A WIDGET'S PROPERTY VIA PROPERTY ATTACHMENT. |
| inviter | EXTENDS PHONE AND INCLUDES CONFERENCE - ENABLES INVITING A TARGET USER TO A CONFERENCE. |
| call-queue | EXTENDS PHONE BUT PUTS INCOMING CALL TO A PENDING CALLS LIST TO ANSWER BY THE END USER. |
| distributor | EXTENDS PHONE TO DO AUTOMATIC CALL DISTRIBUTION TO ONE OR MORE TARGETS IN PARALLEL OR SEQUENCE. |
| dialpad | A TOUCH-TONE KEYPAD INTERFACE THAT ATTACHES TO CLICK-TO-CALL OR CLICK-TO-JOIN. |
| notepad | A SHARED NOTEPAD WITH REAL-TIME UPDATES OF TEXT, AND ATTACHES TO A PHONE OR CONFERENCE. |
| white-board | A SHARED WHITE-BOARD WITH REAL-TIME UPDATES OF DRAWINGS, ATTACHES TO A PHONE OR CONFERENCE. |

*FIG. 8*

PROVIDING DATA RESOURCE SERVICES WITHIN ENTERPRISE SYSTEMS FOR RESOURCE LEVEL SHARING AMONG MULTIPLE APPLICATIONS, AND RELATED METHODS, SYSTEMS, AND COMPUTER-READABLE MEDIA

PRIORITY APPLICATION

The present application claims priority to U.S. Provisional Patent Application Ser. No. 61/868,603 filed Aug. 22, 2013, and entitled "PROVIDING OF DATA RESOURCE SERVICES, PARTICULARLY CLOUD RESOURCE SERVICES, WITHIN ENTERPRISE SYSTEMS FOR RESOURCE LEVEL DATA MASHUP FOR USE BY APPLICATION LOGIC, SUCH AS WEB COMMUNICATIONS WIDGETS," which is hereby incorporated herein by reference in its entirety.

RELATED APPLICATIONS

This application is related to U.S. patent application Ser. No. 13/863,662 filed on Apr. 16, 2013, entitled "DISTRIBUTED APPLICATION OF ENTERPRISE POLICIES TO WEB REAL-TIME COMMUNICATIONS (WEBRTC) INTERACTIVE SESSIONS, AND RELATED METHODS, SYSTEMS, AND COMPUTER-READABLE MEDIA," which is hereby incorporated herein by reference in its entirety.

This application is also related to U.S. patent application Ser. No. 13/923,748 filed on Jun. 21, 2013, entitled "APPLICATION-TO-REPOSITORY DATA MAPPING IN DATA REPOSITORIES, AND RELATED METHODS, SYSTEMS, AND COMPUTER-READABLE MEDIA," which is incorporated herein by reference in its entirety.

BACKGROUND

Field of the Disclosure

The technology of the disclosure relates to data accessibility within enterprise systems.

Technical Background

A common element of web applications involves managing and controlling user data provided by an individual. For instance, the web applications within social networking websites, such as Facebook® and LinkedIn®, provide each user with a personal profile generated from user-provided data. Although the user data is provided by the user, each web application typically controls the user data and limits its use to the specific needs of the web application. In this regard, FIGS. 1A-1B illustrate a typical data control scheme 10. FIG. 1A illustrates the data control scheme 10 wherein a user 12 interacts with a web application 14. Further, the web application 14 controls access to user data 16, as opposed to the user 12 having direct access to the user data 16. In this manner, the user data 16 is tied directly to logic (not shown) of the web application 14, meaning that the user data 16 can only be accessed and used by the web application 14. More specifically, FIG. 1B illustrates another view of the data control scheme 10 showing that in order for a user, such as the user 12 in FIG. 1A, to access a particular web application, such as the web application 14 in FIG. 1A, a web browser 18 communicates with a web server 20. The web server 20 accesses the user data 16 that is tied directly to web application logic 22. Because the user data 16 is directly associated with the web application logic 22, the user data 16 can only be accessed by the web application logic 22. Thus, a particular web application controls user data associated with that web application, and can prevent other web applications from accessing such user data.

Several problems can arise as a result of employing the data control scheme 10 illustrated in FIG. 1A and FIG. 1B. For example, because a web application may not provide access to user data to other web applications, the data control scheme 10 requires a user to provide similar information to multiple websites. This creates redundant instances of the user data across multiple web applications. Further, because each website controls access to its instance of the user data, as opposed to the user controlling such access, each website determines whether other web applications can access the user data. As a result, the user data is locked-in to being accessed and processed by a limited number of web applications as determined by the controlling web application (known as "application lock-in"). The data control scheme 10 in FIGS. 1A and 1B also results in rigid data boundaries, as enterprise systems often block access to certain public websites due to the failure of such websites to restrict the use of user data to enterprise-only functionality. In this regard, enterprise systems are Internet domains that employ Enterprise Application Software (EAS) in order to control which users and applications have access to the Internet domain controlled by a given enterprise. Finally, under the data control scheme 10 in FIGS. 1A and 1B, the user data life during which the user data is accessible corresponds to the life of the website, causing the user data to become obsolete once a website is no longer accessed by the user. For instance, a user with a profile on MySpace® can no longer use data within that profile if the user decides to transfer his or her social networking activities exclusively to Facebook®. Thus, the data control scheme 10 causes certain negative consequences.

The data control scheme 10 described above is also employed with enterprise applications. For instance, an enterprise system may include internal enterprise applications, such as Voice over IP telephone service, instant messaging, e-mail, and Web Real-Time Communications (WebRTC) teleconferencing. However, as is the case with web applications, such enterprise applications often require an enterprise user to provide user data separately to each application, because such data is tied directly to the enterprise application logic. For example, the user data associated with an enterprise user's contact list within an e-mail application may be identical to the user's contact list within an instant messaging application. However, the data control scheme 10 in FIGS. 1A and 1B within the enterprise system may prevent enterprise applications from sharing user data, requiring the user to provide the same information to each enterprise application separately. Thus, similar problems arise within enterprise systems as those previously described in relation to web applications as a result of employing the data control scheme 10 for enterprise applications.

One solution to remedy problems arising from the data control scheme 10 involves the use of shared user data within an enterprise system. More specifically, configuring an enterprise system to access user data tied to web application logic may eliminate the need for enterprise users to separately manage user data for enterprise applications. For instance, an enterprise specific e-mail application may interface to Gmail® accounts for certain e-mail services and features. Alternatively, enterprise application logic may be configured to access and share the user data controlled by a web application. For example, an enterprise specific e-mail application may be configured to access only a user's contact list controlled by Gmail® application logic. However, allowing web applications to run within an enterprise system or share user data associated with web application logic with an enterprise application creates the potential for proprietary, secure enterprise information being accessed without authorization over public web servers that host such web applications. Further, enterprise applications sharing data with web applications still requires users to update multiple instances of user data in order to access similar information across enterprise applications.

Thus, it would be advantageous for enterprise applications to be able to access user data used by web applications in an efficient manner, without leaving secure enterprise information susceptible to unauthorized access over public web servers.

SUMMARY

Embodiments disclosed in the detailed description include providing data resource services within enterprise systems for resource level sharing among multiple applications. Related methods, systems, and computer-readable media are also disclosed. In embodiments disclosed herein, data resource services are provided within an enterprise system to allow user data to be separated from application logic that accesses the user data. A data resource service is a service that stores user data as hierarchical resources (also referred to herein as "data resources") identified by paths or Uniform Resource Locators (URLs) on a server, or another storage medium. The data resources are created as either transient or persistent. A transient data resource is automatically deleted by a server when a client connection that created the data resource is disconnected, while a persistent data resource is not deleted upon disconnection. Using transient data resources helps provide automatic cleanup and robustness against browser crashes. Further, the data resource service is provided within an enterprise system so that users using applications within the enterprise system, as well as web applications having logic outside of the enterprise system, can access the same instance of stored user data based on associated privileges. The user data is centralized within the enterprise system so that the user may control and update a single instance of the user data within the enterprise system.

As a non-limiting example, a user within an enterprise system can use a Web Real-Time Communications (WebRTC)-based chat application (WebRTC Chat) within the enterprise system for instant messaging, and use Gmail® through Google®'s website for e-mail communications. Each application, WebRTC Chat and Gmail®, uses a contact list provided by the user that consists of names and contact information of people with whom the user regularly communicates. Using a data resource service enables the user to create and control one instance of a contact list that is stored within the enterprise system, as opposed to providing separate instances of the contact list to WebRTC Chat and Gmail®. Both WebRTC Chat and Gmail® can access and use the contact list stored within the enterprise system, requiring the user to update and manage only one instance of the contact list for use by both applications.

In this manner, data provided to an enterprise system by a user can be used across multiple applications within the enterprise system, as well as across multiple web applications having logic outside of the enterprise system. Thus, rather than requiring each application within and outside of an enterprise system to manage its own, possibly outdated, user data, each application may rely on a central instance for all user data separate from application logic. Allowing one application to use user data originally created for use by another application in this manner, also known as application "mash-ups," provides multiple exemplary benefits. For example, the user data can be searched and backed-up within the enterprise system independent of a particular web or enterprise application. Unifying data searching and data back-up so that such tasks are not dependent on application logic can provide efficiency and time savings within an enterprise system, as compared to performing similar tasks for separate enterprise applications. Additionally, security within an enterprise system may benefit from the data resource service, as the internal resource data can be held private within an organization without allowing access to proprietary information to public web servers. Further, the data resource service may be attached to other devices or networked applications so as to expose certain information to web applications. The data resource service also provides the flexibility to be used by both web and native enterprise applications. In addition, rather than requiring instances of similar data to exist within the logic of each enterprise and web application, thus requiring separate data management for each instance, the data resource service centralizes one usable instance of the user data within the enterprise system and provides access to such applications as permitted by the user.

In this regard in one embodiment, a method for providing a data resource service within an enterprise system for resource level sharing among multiple applications is provided. The method comprises receiving a user data request from a web application having application logic located outside of an enterprise system to access user data stored in memory within the enterprise system. The method further comprises accessing the user data stored in the memory within the enterprise system in response to the user data request from the web application. The method also comprises providing access to the user data stored in the memory within the enterprise system to the web application in response to the user data request. As a non-limiting example, providing access to the user data may include allowing the web application to read, write, append, or send an event to the user data, as well as traverse a resource tree associated with the user data.

In another embodiment, a system for providing a data resource service within an enterprise system for resource level sharing among multiple applications is provided. The system comprises a memory within an enterprise system configured to store user data. The system also comprises a data resource server configured to receive a user data request from a web application having application logic located outside of the enterprise system to access the user data stored in the memory within the enterprise system. The data resource server is further configured to access the user data stored in the memory within the enterprise system in response to the user data request from the web application. The data resource server is further configured to provide the user data stored in the memory within the enterprise system to the web application in response to the user data request.

In another embodiment, a non-transitory computer-readable medium storing one or more programs is provided. The one or more programs comprise instructions, which when executed by an electronic device cause the electronic device to implement a method for providing a data resource service within an enterprise system for resource level sharing among multiple applications. The method comprises receiving a user data request from a web application having application logic located outside of an enterprise system to access user data stored in memory within the enterprise system. The method further comprises accessing the user data stored in the memory within the enterprise system in response to the user data request from the web application. The method also comprises providing access to the user data stored in the memory within the enterprise system to the web application in response to the user data request.

BRIEF DESCRIPTION OF THE FIGURES

The accompanying drawing figures incorporated in and forming a part of this specification illustrate several aspects of the disclosure, and together with the description serve to explain the principles of the disclosure.

FIG. 8 is table listing exemplary widgets that may be used in conjunction with a data resource service within an enterprise system.

DETAILED DESCRIPTION

Figure 1A:
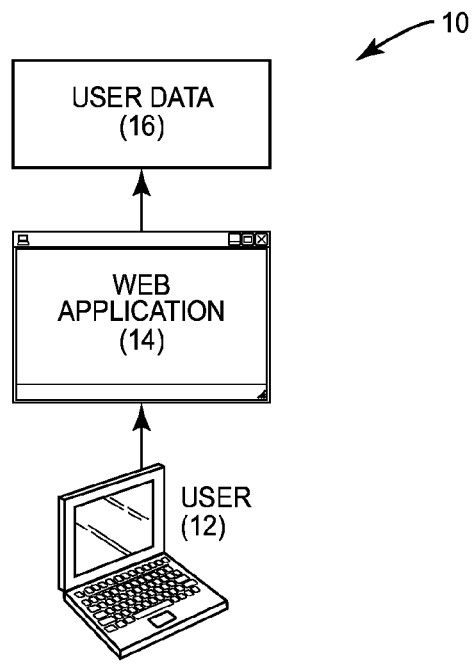
FIG. 1A is a block diagram of an exemplary data control scheme in which access to user data is controlled and managed by a web application.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed herein include providing data resource services within enterprise systems for resource level sharing among multiple applications. Related methods, systems, and computer-readable media are also disclosed. In embodiments disclosed herein, data resource services are provided within an enterprise system to allow user data to be separated from application logic that accesses the user data. A data resource service is a service that stores user data as hierarchical resources (also referred to herein as "data resources") identified by paths or Uniform Resource Locators (URLs) on a server, or another storage medium. The data resources are created as either transient or persistent. A transient resource is automatically deleted by a server when a client connection that created the data resource is disconnected, while a persistent data resource is not deleted upon disconnection. Using transient data resources helps provide automatic cleanup and robustness against browser crashes. Further, the data resource service is provided within an enterprise system so that users using applications within the enterprise system, as well as web applications having logic outside of the enterprise system, can access the same instance of stored user data based on associated privileges. The user data is centralized within the enterprise system so that the user may control and update a single instance of the user data within the enterprise system.

As a non-limiting example, a user within an enterprise system can use a Web Real-Time Communications (WebRTC)-based chat application (WebRTC Chat) within the enterprise system for instant messaging, and use Gmail® through Google®'s website for e-mail communications. Each application, WebRTC Chat and Gmail®, uses a contact list provided by the user that consists of names and contact information of people with whom the user regularly communicates. Using a data resource service enables the user to create and control one instance of a contact list that is stored within the enterprise system, as opposed to providing separate instances of the contact list to WebRTC Chat and Gmail®. Both WebRTC Chat and Gmail® can access and use the contact list stored within the enterprise system, requiring the user to update and manage only one instance of the contact list for use by both applications.

In this manner, data provided to an enterprise system by a user can be used across multiple applications within the enterprise system, as well as across multiple web applications having logic outside of the enterprise system. Thus, rather than requiring each application within and outside of an enterprise system to manage its own, possibly outdated, user data, each application may rely on a central instance for all user data separate from application logic. Allowing one application to use user data originally created for use by another application in this manner, also known as application "mash-ups," provides multiple exemplary benefits. For example, the user data can be searched and backed-up within the enterprise system independent of a particular web or enterprise application. Unifying data searching and data back-up so that such tasks are not dependent on application logic can provide efficiency and time savings within an enterprise system, as compared to performing similar tasks for separate enterprise applications. Additionally, security within an enterprise system may benefit from the data resource service, as the internal resource data can be held private within an organization without allowing access to proprietary information to public web servers. Further, the data resource service may be attached to other devices or networked applications so as to expose certain information to web applications. The data resource service also provides the flexibility to be used by both web and native enterprise applications. In addition, rather than requiring instances of similar data to exist within the logic of each enterprise and web application, thus requiring separate data management for each instance, the data resource service centralizes one usable instance of the user data within the enterprise system and provides access to such applications as permitted by the user.

In this regard in one embodiment, a method for providing a data resource service within an enterprise system for resource level sharing among multiple applications is provided. The method comprises receiving a user data request from a web application having application logic located outside of an enterprise system to access user data stored in memory within the enterprise system. The method further comprises accessing the user data stored in the memory within the enterprise system in response to the user data request from the web application. The method also comprises providing access to the user data stored in the memory within the enterprise system to the web application in response to the user data request. As a non-limiting example, providing access to the user data may include allowing the web application to read, write, append, or send an event to the user data, as well as traverse a resource tree associated with the user data.

Figure 2A:
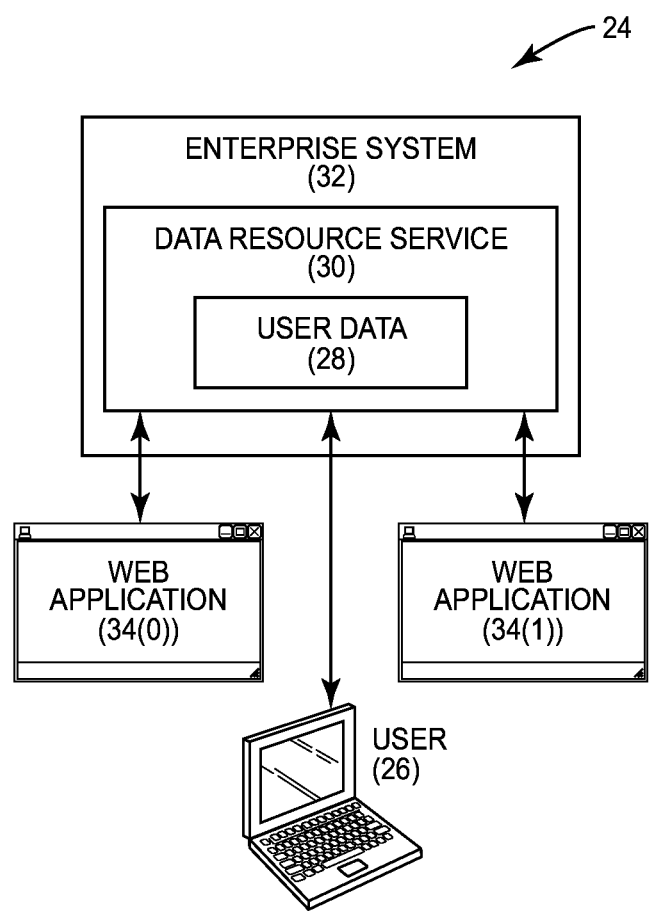
FIG. 2A is a block diagram of an exemplary data resource service within an enterprise system wherein access to user data is managed and controlled by a user rather than by a web application.
Figure 2B:
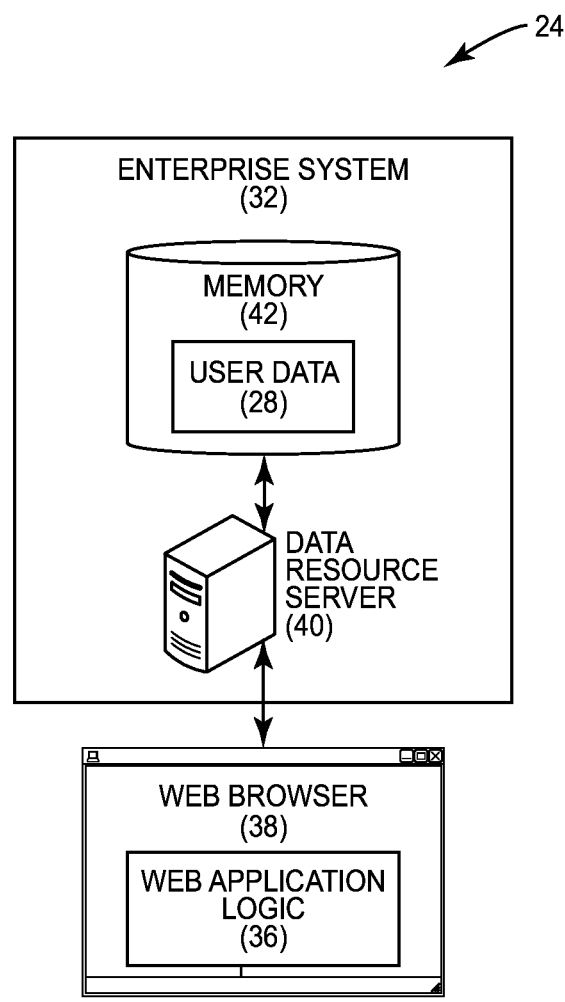
FIG. 2B is a block diagram of an exemplary relationship in which access to user data is controlled by a user by way of a data resource service rather than being tied to web application logic, wherein the web application logic runs in a web browser and accesses the user data via the data resource service.

In this regard, FIGS. 2A-2B illustrate an exemplary data resource service control scheme 24. More specifically, FIG. 2A illustrates the data resource service control scheme 24 wherein a user 26 provides user data 28 to a data resource service 30 located within an enterprise system 32. While this example illustrates the user 26 existing outside of the enterprise system 32, the user 26 may function in a similar manner within the enterprise system 32. Further, providing the user data 28 to the data resource service 30 allows the user 26 to retain control over access to the user data 28. This is in contrast to the data control scheme 10 in FIG. 1A previously described, in which the web application 14 controls access to the respective user data 16. Additionally, because the user data 28 in FIG. 2A is provided to the data resource service 30, only one instance of the user data 28 is provided by the user 26, as opposed to creating a separate instance for each web application 34(0)-34(1). Therefore, each web application 34(0)-34(1) must send a user data request (not shown) to the data resource service 30 in order to access the user data 28. For example, if the data resource service 30 receives a user data request from the web application 34(0) for the user data 28, the data resource service 30 will provide the requested user data 28 to the web application 34(0).

Figure 1B:
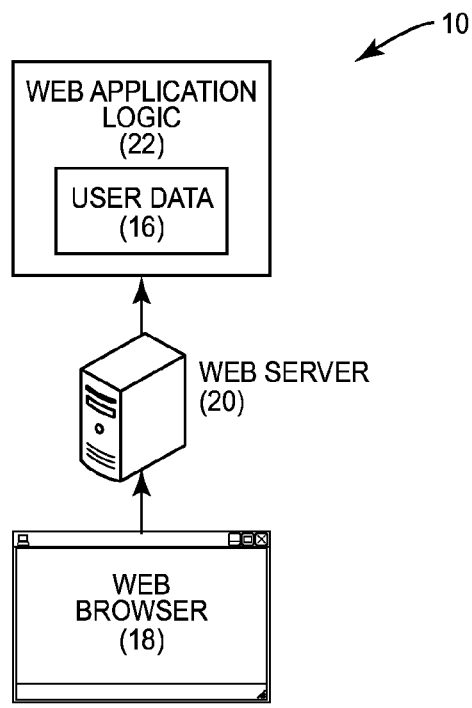
FIG. 1B is a block diagram of the data control scheme in FIG. 1A illustrating that the user data is tied to web application logic, wherein a web browser communicates with the web application logic and accesses the user data via a web server.

In this regard, FIG. 2B illustrates another view of the data resource service control scheme 24 showing an example of how the user data 28 is accessed from the data resource service 30 in FIG. 2A on a device level. The data resource service control scheme 24 in FIG. 2B contains certain common components with FIG. 2A, which are shown with common element numbers between FIGS. 2A and 2B. More specifically, in this example, web application logic 36 runs within a web browser 38, as opposed to being accessed by the web browser 18 through the web server 20 as illustrated in FIG. 1B. While the web application logic 36 runs within the web browser 38 in this example, it is possible to structure the data resource service 30 of FIG. 2A so that the web application logic 36 runs on the web server 20 of FIG. 1B if the web server 20 interfaces with the data resource service 30. The web application logic 36 sends a user data request (not shown) for the user data 28 to a data resource server 40, which implements the data resource service 30 in FIG. 2A. For example, the data resource server 40 may store and manage the user data 28 as hierarchical resources identified by paths or URLs. While the data resource service 30 in FIG. 2A is implemented using the data resource server 40 in this example, the data resource service 30 may be implemented using any other device that provides additional server functions. Further, upon receiving the user data request, the data resource server 40 accesses the user data 28 that is stored in memory 42 within the enterprise system 32. The data resource server 40 provides the requested user data 28 to the web application 34 (not shown in FIG. 2B) via the web application logic 36 for processing. In this example, the web application 34 has its web application logic 36 located outside of the enterprise system 32. However, an enterprise application (not shown) having its enterprise application logic (not shown) within the enterprise system 32 can request and receive the user data 28 in a similar manner. By using the data resource service 30 in FIG. 2A to store and provide the requested user data 28, the user 26 (not shown in FIG. 2B) is able to create and manage just one instance of the user data 28. This allows for greater efficiency in managing and accessing the user data 28 across multiple web applications 34 and enterprise applications.

Figure 3A:
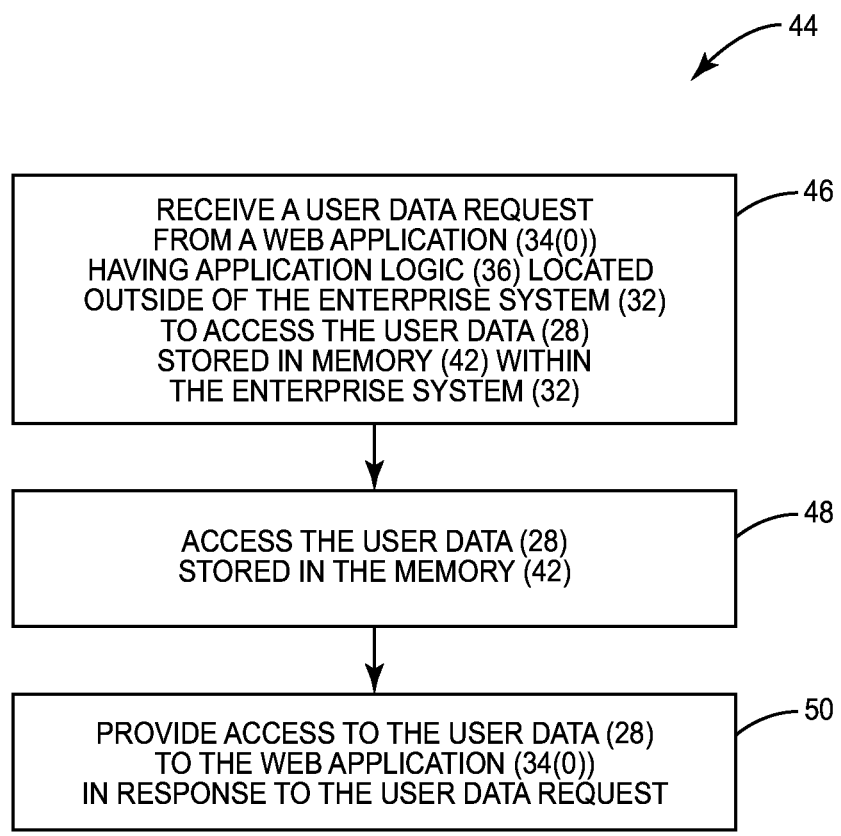
FIG. 3A is an exemplary flowchart illustrating exemplary functions of a data resource service within an enterprise system configured to provide access to user data to a web application.

In this regard, FIG. 3A illustrates an exemplary flowchart 44 describing exemplary functions of the data resource service 30 described in FIG. 2A and implemented by the data resource server 40 in FIG. 2B. The flowchart 44 in FIG. 3A references certain common components with FIGS. 2A-2B, which are shown with common element numbers between the figures. More specifically, in FIG. 3A, the data resource service 30 receives a user data request from the web application 34(0) having its web application logic 36 located outside of the enterprise system 32. The web application 34(0) sends such a user data request in order to gain access to the user data 28 stored in the memory 42 located within the enterprise system 32 (block 46). In response to the user data request from the web application 34(0) at block 46, the data resource service 30 accesses the user data 28 stored in the memory 42 within the enterprise system 32 (block 48). The data resource service 30 then provides access to the requested user data 28 to the web application 34(0) (block 50). Importantly, the data resource service 30 can provide access to the user data 28 to the web application 34(0) even if the user data 28 was originally created by the user 26 for a different web application 34(1). In addition, while FIG. 3A illustrates an example of the data resource service 30 receiving the user data request from the web application 34(0), the data resource service 30 functions in a similar manner when such a user data request originates from an enterprise application (e.g., an application whose logic is located within the enterprise system 32). Further, the data resource service 30 can receive user data updates from the user 26 and store the user data 28 within such updates in the memory 42. Thus, the data resource service 30 enables the user 26 to manage one instance of the user data 28 that is used by multiple web applications 34 and enterprise applications, creating more efficient use and management of the user data 28.

Figure 3B:
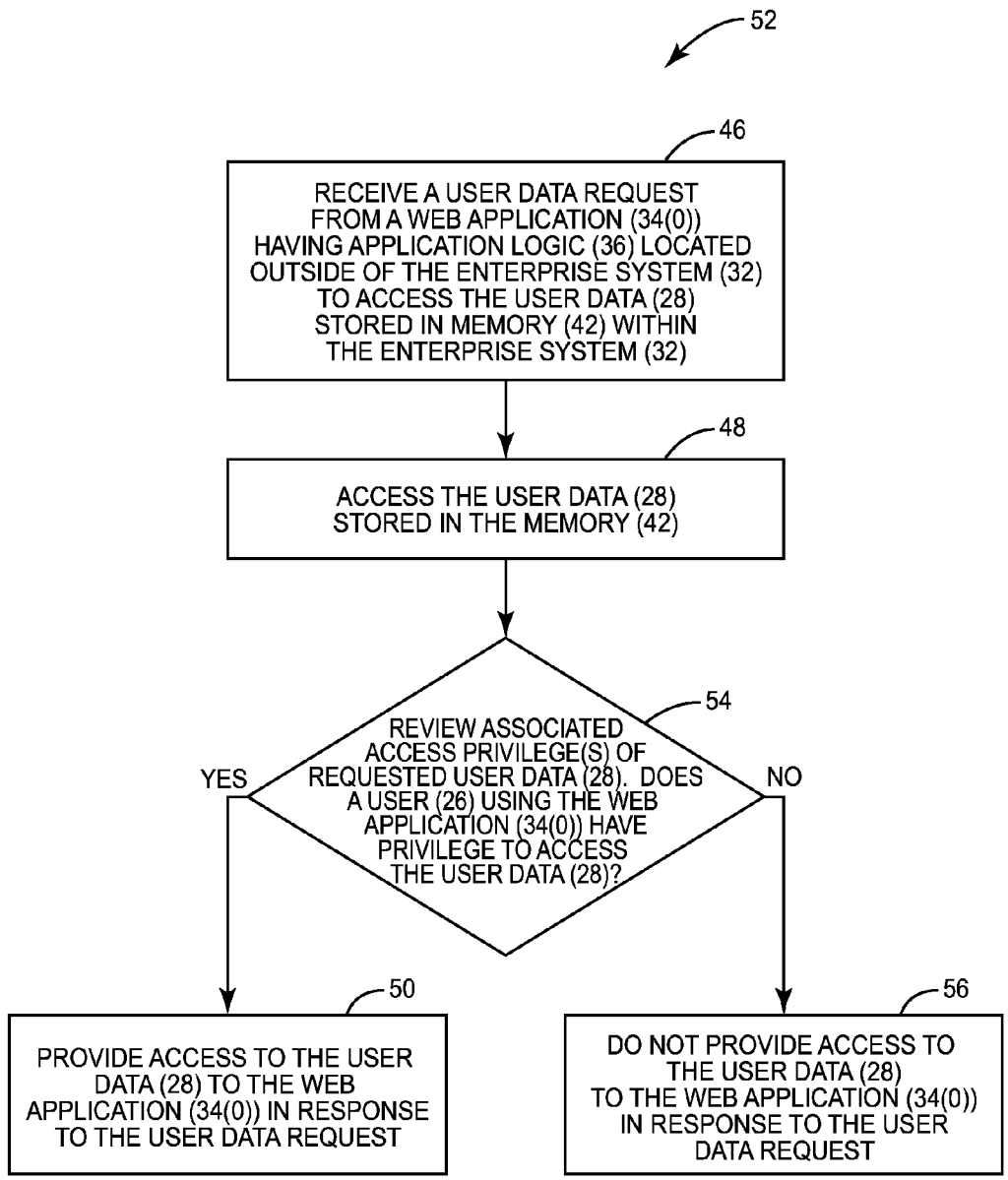
FIG. 3B is an exemplary flowchart illustrating exemplary functions of a data resource service within an enterprise system configured to provide access to user data to a web application if the user data includes an associated access privilege allowing a user of the web application to access such user data.

In this regard, FIG. 3B illustrates an exemplary flowchart 52 describing the data resource service 30 functions described in FIG. 3A, and includes security functions in order to provide added protection for the user data 28. The flowchart 52 in FIG. 3B references certain common components with FIGS. 2A-2B and FIG. 3A, which are shown with common element numbers between the figures. More specifically, FIG. 3B illustrates that the data resource service 30 receives a user data request (block 46) and accesses the user data 28 (block 48), as previously described in FIG. 3A. As a non-limiting example, an access of the user data 28 may include reading, writing, appending, or sending an event to the user data 28, as well as traversing a resource tree associated with the user data 28. Each type of access may require a separate access privilege. After accessing the user data 28 at block 48, the data resource service 30 reviews any access privileges associated with the user data 28 (block 54) prior to providing access to any user data 28 to the requesting web application 34(0). For example, a "read" privilege may be needed to access the user data 28. If any associated access privileges with the user data 28 allow the user 26 using the requesting web application 34(0) to access the user data 28, then the data resource service 30 provides the user data 28 to the web application 34(0) (block 50), as described in FIG. 3A. Conversely, if none of the associated access privileges with the user data 28 allow the user 26 using the requesting web application 34(0) to access the user data 28, the data resource service 30 will not provide access to the user data 28 to the web application 34(0) in response to the user data request (block 56). Thus, in addition to creating efficiency in managing the user data 28, the data resource service 30 may provide additional security privileges for the user data 28 so as to help prevent unauthorized access of proprietary user and enterprise information.

Figure 4:
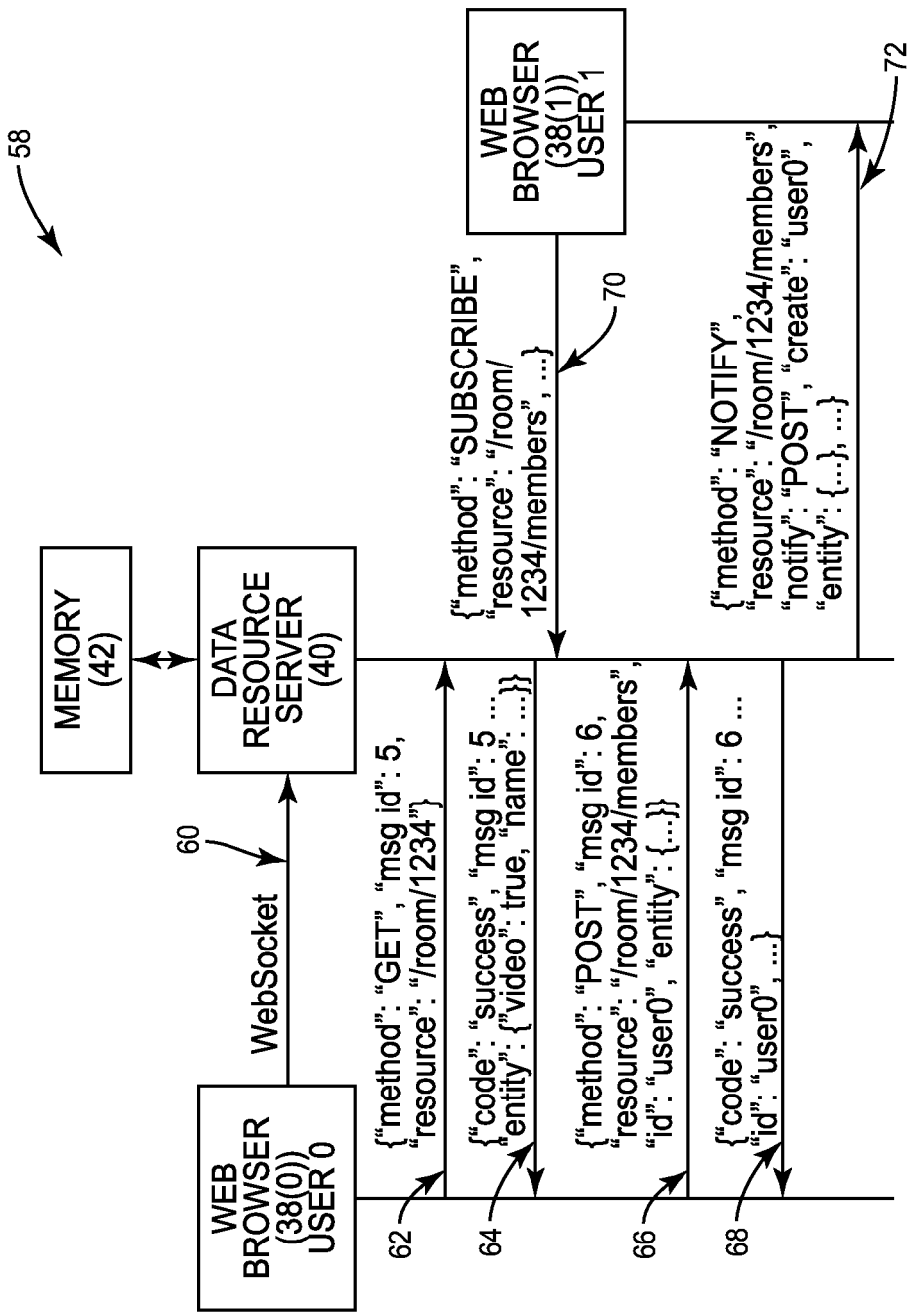
FIG. 4 is an exemplary message flow diagram illustrating data access and event notification within a data resource service-based system.

The data resource service 30 previously described in FIGS. 2A-2B and FIGS. 3A-3B may communicate with the web application 34 in various ways. In this regard, FIG. 4 illustrates an exemplary message flow diagram 58 illustrating data access and event notification within a data resource service-based system. The message flow diagram 58 in FIG. 4 contains certain common components with FIGS. 2A-2B, which are shown with common element numbers between the figures. More specifically, in this example, the data resource server 40 accesses the user data 28 (not shown) from the memory 42, both of which are located within the enterprise system 32 (not shown). In this example, User 0 communicates with the data resource service 30 (not shown) by establishing a WebSocket connection from a web browser 38(0) to the data resource server 40, as indicated by arrow 60. Once such a connection is established, User 0 issues a user data "read" request by way of a "GET" command for data accessible via path "/room/1234," as indicated by arrow 62. In response to receiving the user data request, the data resource server 40 accesses the memory 42. Further, the data resource server 40 provides the requested user data 28 to User 0, indicating that the user data request was a "success," and also provides resource data content (or entity representation) to User 0, as indicated by arrow 64. In addition to requesting the user data 28, User 0 may also update the user data 28 in the memory 42 by way of the data resource server 40. In this example, User 0 provides a user data "create" by using a "POST" command to store a "resource" identifiable as being accessible via a path "/room/1234/members" for "User 0," as indicated by arrow 66. In this example, the data resource server 40 indicates that the user data update completed with an acknowledgement of "success," as indicated by arrow 68.

With continuing reference to FIG. 4, User 1 may communicate with the data resource server 40 while User 0 is connected to the data resource server 40. In this example, similar to User 0, User 1 communicates with the data resource service 30 (not shown) by establishing a Web-Socket connection (not shown) from a web browser 38(1) to the data resource server 40. Using this connection, User 1 sends a user data request so as to receive notifications when any changes occur within the resource accessible via the path "room/1234/members" by issuing a "SUBSCRIBE" request, as indicated by arrow 70. Thus, in response to the user data update by User 0 previously described at arrow 66, the data resource server 40 provides User 1 with a "NOTIFY" message that User 0 made a "POST" to the resource accessible via the "/room/1234/members" path, as indicated by arrow 72.

Figure 5:
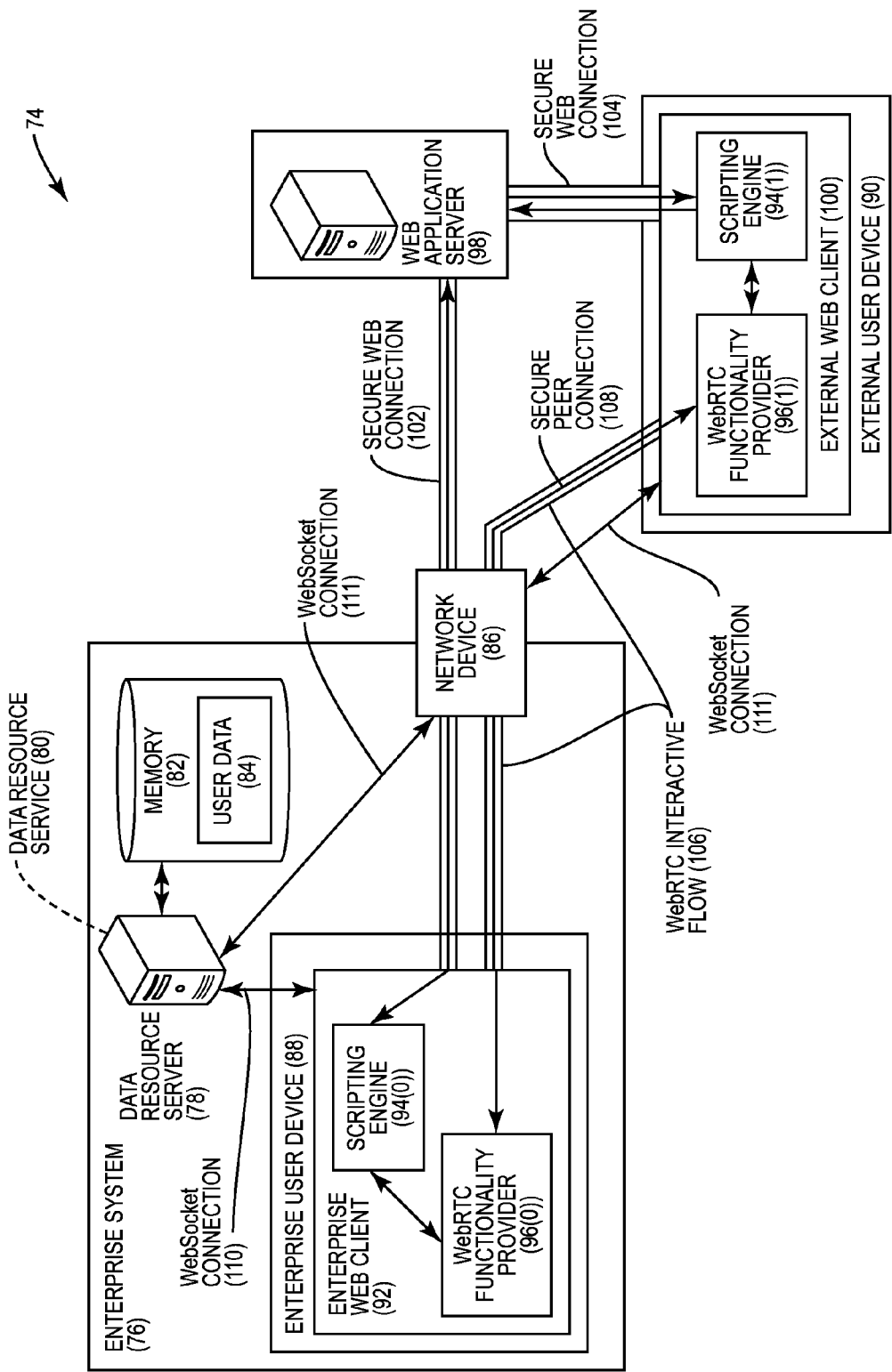
FIG. 5 is a conceptual diagram showing an exemplary topology of a Web Real-Time Communications (WebRTC) interactive session between two users using a WebRTC widget in the context of a data resource service.

In addition to the data access and event notification scenario illustrated in the message flow diagram 58 in FIG. 4, the data resource service 30 previously described may be used with communications applications. For example, a data resource service 30 may interact with communications applications whose application logic runs within web browsers. A communications application, such as for example, a WebRTC application, may be implemented using a widget, which may comprise a collection of Hyper Text Markup Language (HTML), JavaScript, and/or Cascading Style Sheets code, and may be embedded within a client, such as a web browser. A widget hides the implementation details or the requirements of an application and exposes simple properties and interconnects of the application. A widget may be used as a standalone application or may interconnect with other widgets. Further, multiple widgets may interconnect via the properties of inclusion, attachment, or property attachment. In this regard, FIG. 5 illustrates an exemplary topology 74 of a WebRTC interactive session between two users using WebRTC applications implemented using WebRTC widgets in the context of a data resource service. In particular, an enterprise system 76 includes a data resource server 78 that implements a data resource service 80. The data resource server 78 is coupled to a memory 82 that stores user data 84 within the enterprise system 76. In this example, the enterprise system 76 includes a network device 86 that prevents unauthorized access to the enterprise system 76, such as for example, a firewall.

With continuing reference to FIG. 5, a WebRTC interactive session is established between an enterprise user device 88 and an external user device 90. As used herein, a WebRTC interactive session refers to operations for carrying out a WebRTC offer/answer exchange, establishing a peer connection, and commencing a WebRTC interactive flow between two or more endpoints. Within the enterprise system 76, the enterprise user device 88 executes an enterprise web client 92, such as a web browser. In this example, the enterprise web client 92 comprises a scripting engine 94(0) that enables client-side applications written in a scripting language. The scripting engine 94(0) also provides an application programming interface (API) (not shown) to facilitate communications with other functionality providers within the enterprise web client 92 and/or the enterprise user device 88. The enterprise web client 92 also includes a WebRTC functionality provider 96(0) used to implement the protocols, codecs, and APIs necessary to enable real-time interactive sessions via WebRTC. External to the enterprise system 76 is a web application server 98 that serves a WebRTC-enabled web application (not shown) to requesting web clients. Also external to the enterprise system 76 is the external user device 90 executing an external web client 100, such as a web browser. In this example, the external web client 100 comprises a scripting engine 94(1) and a WebRTC functionality provider 96(1), the functionality of which corresponds to the functionality of the scripting engine 94(0) and the WebRTC functionality provider 96(0), respectively.

With continuing reference to FIG. 5, to establish a WebRTC interactive session, the enterprise web client 92 and the external web client 100 both download the same WebRTC web application (not shown) from the web application server 98. The enterprise web client 92 and the external web client 100 establish secure web connections 102 and 104, respectively, with the web application server 98, and engage in a WebRTC offer/answer exchange. Once the WebRTC offer/answer exchange is complete, a WebRTC interactive flow 106 may be established via a secure peer connection 108 between the enterprise web client 92 and the external web client 100. In addition, the enterprise web client 92 and the external web client 100 each establish a WebSocket connection 110 and 111, respectively, with the data resource server 78. The external web client 100 must have the necessary privileges to establish the WebSocket connection 111 through the network device 86 of the enterprise system 76. Further, after establishing the WebSocket connections 110 and 111, respectively, the enterprise web client 92 and the external web client 100 may each send user data requests and user data updates to the data resource server 78. In response to such requests and updates, the data resource server 78 accesses the user data 84 stored within the memory 82 as previously described.

Figure 6:
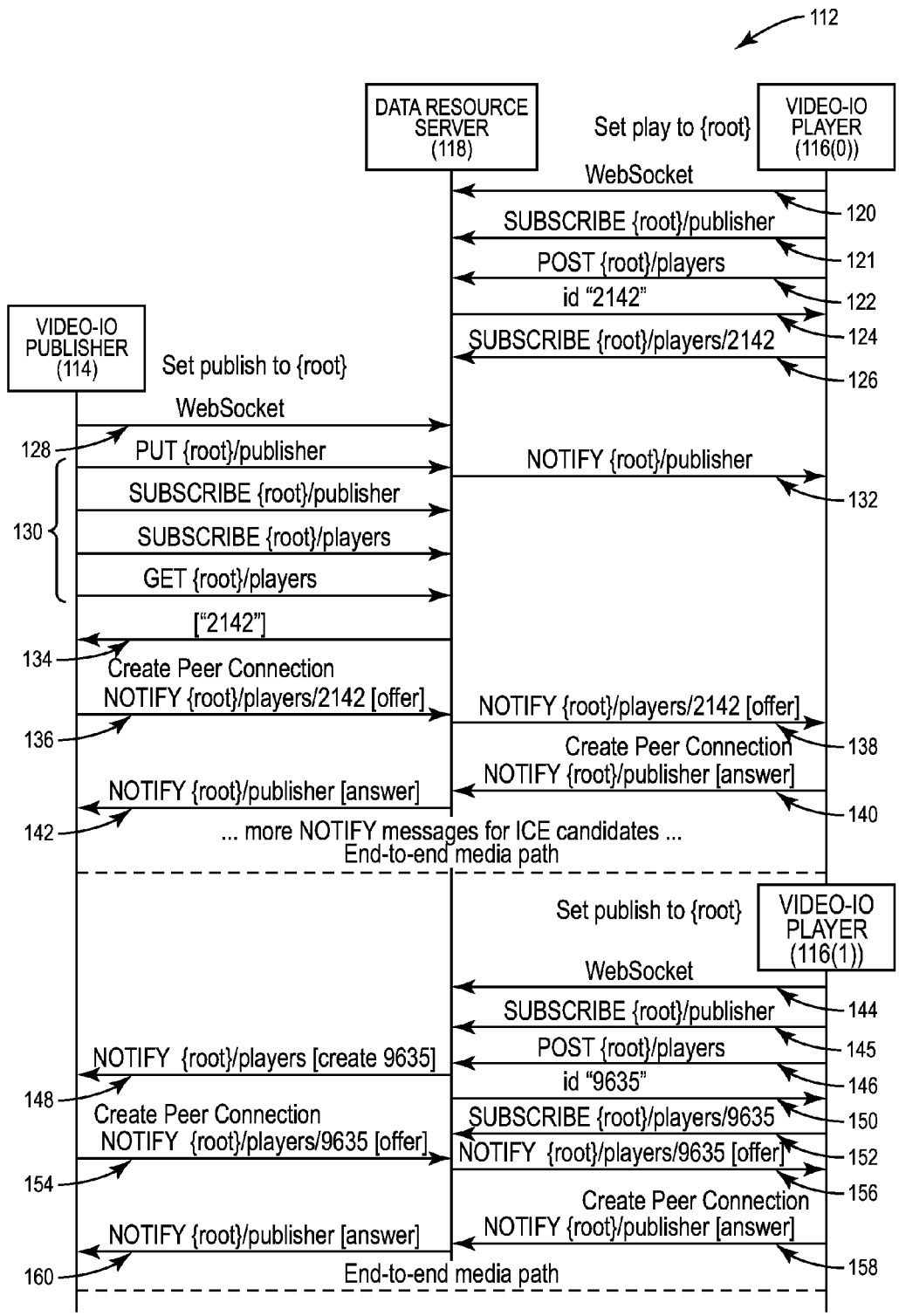
FIG. 6 is an exemplary message flow diagram for a WebRTC video-io widget functioning within a data resource service within an enterprise system.

In this regard, FIG. 6 illustrates an exemplary message flow diagram 112 for a WebRTC video-io widget that runs within a client, such as a web browser, and functions in conjunction with a data resource service within an enterprise system. In this example, the video-io widget allows an application to create a peer connection between two web browsers to exchange real-time media streams such as live video using Interactive Connectivity Establishment (ICE). The video-io widget has a video box to either publish a locally captured camera and microphone or play a remote stream or media file from the web, while hiding the signaling negotiations. In particular, the video-io widget creates a peer connection from a video-io publisher to a video-io player on the same data resource path. In this example, a video-io publisher 114 publishes videos to video-io players 116(0)-116(1) over separate peer connections. More specifically, the video-io player 116(0) establishes a WebSocket connection with a data resource server 118 located within an enterprise system, as indicated by arrow 120. After establishing such a connection, the video-io player 116(0) subscribes to the resource "{root}/publisher", as indicated by arrow 121. The video-io player 116(0) also creates a child resource under the parent "{root}/players" resource using a "POST" method, as indicated by arrow 122, wherein "{root}" represents the root path for that stream resource, such as /path/to/stream1 (not shown). The data resource server 118 notifies the video-io player 116(0) that such a child resource has been created with an id of "2142," as indicated by arrow 124. The video-io player 116(0) then subscribes to the resource "{root}/players/2142" so as to be notified of any videos published at that resource, as indicated by arrow 126.

With continuing reference to FIG. 6, the video-io publisher 114 establishes a WebSocket connection with the data resource server 118, as indicated by arrow 128. Further, the video-io publisher 114 creates a "publisher" resource under "{root}," and subscribes to receive change notifications for resources under "{root}/publisher" and "{root}/players," as indicated by arrow 130. Because the video-io player 116(0) previously subscribed to be notified of changes to the resource at "{root}/publisher," the video-io player 116(0) receives a notification regarding the activity of the video-io publisher 114, as indicated by arrow 132. Similarly, because the video-io publisher 114 subscribed to receive notifications regarding the resource "{root}/players," the video-io publisher 114 receives an indication that "2142" has been created within the resource, as indicated by arrow 134. In response, the video-io publisher 114 offers to setup a peer connection with the video-io player 116(0), by sending a notification on the "{root}/players/2142" resource, as indicated by arrow 136. Such an offer is propagated to the subscribing video-io player 116(0) (arrow 138) by the data resource server 118, and the video-io player 116(0) accepts the offer (arrow 140), which is received by the video-io publisher 114 (arrow 142). Thus, the video-io publisher 114 and the video-io player 116(0) establish a peer-to-peer connection to stream video using the video-io widget, wherein the signaling and data for such video streams are accessible through the data resource server 118 via the path "{root}/players/2142."

With continuing reference to FIG. 6, the new video-io player 116(1) also establishes a WebSocket connection with the data resource server 118, as indicated by arrow 144. After establishing such a connection, the video-io player 116(1) subscribes to the resource "{root}/publisher", as indicated by arrow 145. The video-io player 116(1) establishes a child resource under the parent "{root}/players" resource using a "POST" method, as indicated by arrow 146. The video-io publisher 114 receives a notification that the child resource requested by the video-io player 116(1) will be created with an id of "9635," as indicated by arrow 148. The data resource server 118 notifies the video-io player 116(1) that such a child resource has been created with an id of "9635," as indicated by arrow 150. The video-io player 116(1) then subscribes to the resource "{root}/players/9635" so as to be notified of any videos published at that resource, as indicated by arrow 152. Similar to the video-io player 116(0), the video-io publisher 114 offers to setup a peer connection with the video-io player 116(1), identifiable by the "{root}/players/9635" resource, as indicated by arrow 154. Such an offer is propagated to the video-io player 116(1) (arrow 156), and the video-io player 116(1) accepts the offer (arrow 158), which is received by the video-io publisher 114 (arrow 160). Thus, the video-io publisher 114 and the video-io player 116(1) establish a peer-to-peer connection to stream video using the video-io widget, wherein the signaling and data for such video streams are accessible through the data resource server 118 via the path "{root}/players/9635." Finally, the video-io widget may also enable the video-io publisher 114, the video-io player 116(0), and the video-io player 116(1) to terminate their respective WebSocket connections to the data resource server 118.

Figure 7:
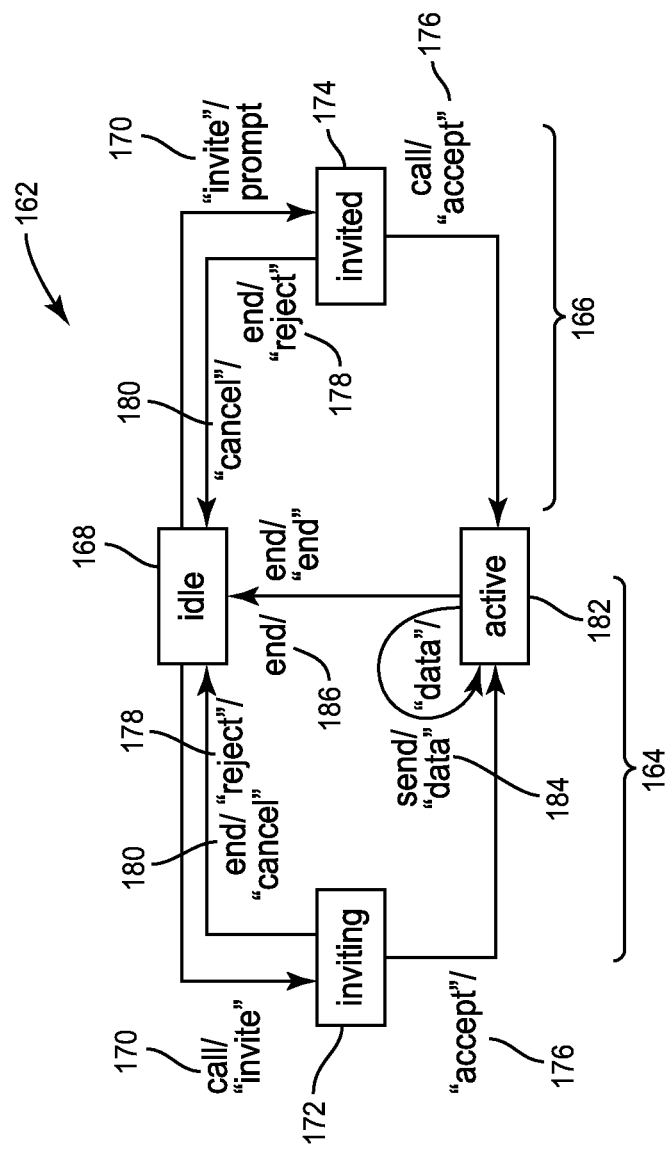
FIG. 7 is an exemplary state machine of a phone widget.

In addition to the video-io widget described in FIG. 6, widgets may be used to implement other web applications that function using a data resource service. In this regard, FIG. 7 illustrates an exemplary state machine 162 of a phone widget that could be used in conjunction with a data resource service within an enterprise system. More specifically, the phone widget emulates existing telephony using a series of signaling messages between two users, a first user 164 and a second user 166. In a two party call, the first user 164 and the second user 166 employ each respective instance of the phone widget to transition between multiple call states based on triggers, as illustrated in the state machine 162. For example, from an idle state 168, the first user 164 may click a call button to invite the second user 166 to join a telephone call using an invite message 170, placing the call in an inviting state 172 for the first user 164. The second user 166 receives the invite message 170 while in the idle state 168, which prompts the second user 166 regarding the incoming call, and transitions the second user 166 from the idle state 168 to an invited state 174. The second user 166 may either answer the call by clicking on a call button, thereby instructing the phone widget to send an accept message 176 to accept the invite message 170. Conversely, the second user 166 may decline the call by clicking on an end button, thereby instructing the phone widget to send a reject message 178. If the first user 164 clicks on the end button for an outgoing pending call, the first user's 164 phone widget sends a cancel message 180, which is received by the second user's 166 phone widget, and eventually cancels the incoming call for the second user 166. This transitions the call to the idle state 168 for both the first user 164 and the second user 166. If the second user 166 rejects the invite message 170, then the first user's 164 phone widget receives the reject message 178 and transitions to the idle state 168. If the second user 166 accepts the invite message 170, the call enters an active state 182 and sends the accept message 176 to the first user's 164 phone widget, thereby transitioning the call to the active state 182 for both users. While the call is in the active state 182, if either user 164 or 166 sends a data message 184, the call remains in the active state 182. However, if either the first user 164 or the second user 166 clicks the end button to terminate the call, the corresponding phone widget sends an end message 186 while in the active state 182. This terminates the call and places it in the idle state 168 for both the first user 164 and the second user 166.

As a non-limiting example, an exemplary message issued from the phone widget described in FIG. 7 may originate from a user, wherein the user invites another user to join a call, where the invitation is identified by the number "5324." An exemplary message of such a call could include the following: {"type": "invite", "invite-id": "5324", "from": "/path/to/user1"} (not shown). In addition to the video-io widget described in FIG. 6 and the phone widget described in FIG. 7, a widget may be configured to interconnect to one or more other widgets in order to function as a single web application that functions with a data resource service.

In this regard, FIG. 8 provides a table 188 of exemplary widgets that may be used with a data resource service. For example, a click-to-call widget is a web audio phone with a button to initiate, answer, or terminate a call. The click-to-call widget delegates call control logic to the included phone widget, and WebRTC-based media processing to two audio-io widgets, one for publishing and another for play. For example, the click-to-call widget binds the phone widget's resource property to the publishing audio-io widget's publish property, and its target_resource property to the playing audio-io widget's play property. A web developer may modify the widgets to change the web phone's behavior; for example, interconnecting the audio-io references to video-io widgets allows the phone widget to be used as a video phone while using the same call control. The phone reference can be set to another telephony-based widget, such as a call-queue or automatic call distributor. Call-queue extends the phone widget to put a received call invitation in a list displayed to a user, and allows the user to select one invitation at a time to answer or decline. The distributor widget extends the phone widget to allow multiple targets. When a call is placed, an invite is sent to all the target resources either in parallel or in sequence or a combination of the two based on a corresponding distribution property. These telephony widgets are compatible with the phone widget, because each uses the same type of signaling messages and each can be used wherever the phone widget is applicable.

With continuing reference to the exemplary widgets listed in the table 188 in FIG. 8, a conference widget represents a multiparty conference bound to a data resource path under which all of its conference and membership resources are created. When multiple widgets set their data resource property to the same path, they subscribe to the same conference and listen for a change in its members. For example, if a data resource is "/path/to/conf1/," then "/path/to/conf1/members" is an array resource of its members. When a "me" property is set to a local user's data, the conference widget joins the conference on the user's behalf and adds the data to the members array. These two properties are sufficient to control the conference widget. Additionally, the conference widget defines "join_id" and "myid" properties so as to control and indicate the local member's child identifier, if needed. The phone and conference widgets have the core telephony concepts that are useful in many applications. Further, the click-to-join widget provides a button to join or leave a conference. Additionally, an inviter widget extends the phone widget for use in a conference, wherein a user invites another participant to the conference using the same protocol as the phone widget.

With continuing reference to the exemplary widgets listed in the table 188 in FIG. 8, a roster widget displays a list of users, their presence statuses and custom messages based on an array resource path. The roster widget can show a contact list in an instant messenger or display a membership list when attached to a conference widget. A videos widget supports video conferencing on a data resource path and includes one video-io item per participant. If the video widget is attached, video is added to an otherwise audio-only conference or phone application. Further, the video widget may provide a tile or a picture-in-picture layout based on the number of participants. However, an application may override the layout by supplying a static set of video-io widgets; for example, an application may provide a fixed four-party video conference with a 2×2 layout. Further, a text-chat widget implements a multi-party text-chat function. More specifically, the text-chat widget has a text-feed to show messages in an array resource, and a text input control to post a message to that resource. The message contains sender data, the date/time of creation, message type, and the actual message either in plain text or HTML. The persistent property controls whether the message resources are persistent or transient. The chat history storage and access is implicit in the resource model. A text-feed widget can display any list of messages such as forum posts or comments on a page. The text-chat widget includes popular instant messenger features such as emoticons and file sharing using the data resource model. In addition, a user can drag a file from a desktop to this widget to share it with other connected users. The file content is encapsulated as a data URL in the chat message resource, without an explicit file sharing protocol.

With continuing reference to FIG. 8, a conversation widget includes conference, text-chat, videos, and roster for a complete multimedia conversation. Similar to the conference widget, the conversation widget defines a root resource path and myid to subscribe and join a conference path, respectively. The user interface allows initiation of audio and video capabilities, or sending of text messages in a conversation. A call_type resource attribute within the conversation widget indicates if the conversation has audio, video, or text-only capabilities. Additional widgets, such as videos, text-chat, notepad, and white-board, may be attached to a conference or phone widget, or a compatible extension in order to build an application. Such an attachment determines whether the application logic uses the conference member's or the phone subscriber's resource path. The ability to interconnect multiple widgets to build an application is a very powerful and flexible way to create modular and extensible applications, such as a video blog, video presence, or online games with interactions.

In this regard, various applications may be built using a combination of the widgets listed in the table 188 in FIG. 8, such as a public chat service. For example, when a user visits a website, a client application joins a public room's resource, such as, /apps/public-chat/public. A room has two child array resources, userlist and chathistory, for the current participants' list and chat messages. The client subscribes to these resources to display the user roster and chat history. The public chat service allows video conferencing using a fixed 3×2 layout of video-io widgets. Unlike existing symmetric video conferencing, the public chat service allows asymmetric media paths, wherein each user decides whom the user wants to see and from whom the user wants to hear. A user can send private messages to a target user via a direct NOTIFY on the target user's resource instead of a POST on chathistory.

In addition to the public chat service, a communicator application may also be implemented using the widgets. For example, a user signup may create a data resource, such as /users/name@company.com. All contacts and profile data, such as presence status, are rooted under this particular data resource, and a roster widget binds to the user's contacts. The conversation widget enables a multimedia chat starting as two-party and extends to multiparty when the user drags more contact items into a conversation window. A conversation binds to a message thread resource, allowing the merging of conversations, wherein a new incoming thread received from a person for whom the user already has a conversation is merged with an existing conversation. However, the user profile and conversation data are not controlled by a single application. For example, a presence icon is bound to a target's presence resource, and can be embedded in other places such as a corporate directory or a user's home page. Clicking the icon opens a conversation widget that seamlessly interacts with the target's communicator because both applications share the same data resource design.

In addition, a video presence application may also be created using the widgets listed in the table 188 in FIG. 8. For example, a video presence web page may show a list of contacts based on an array resource path managed by an owner. Each item in the list is a live video feed from that contact. The owner can click on a contact's video to initiate a voice (and text) call. Such an application uses the video-io widget in the list item, and the conference, inviter, text-chat, and one or more audio-io widgets in a call. Further, a personal wall application may be built using similar widgets. For example, a personal wall may be used as an enterprise social network where a user visits another user's wall to post messages or share calendar events, business cards, or files. All such shared data are resources with associated access privileges. In addition, contextual sharing of enterprise data may also be added. For example, when a User A visits a User B's wall, User A may see the last few conversations and shared files they have had outside of the application. The previously described applications are fairly small with sub-thousand to a few thousand lines of code, but demonstrate the wide variety of applications that can be built using the data resource model.

Figure 9:
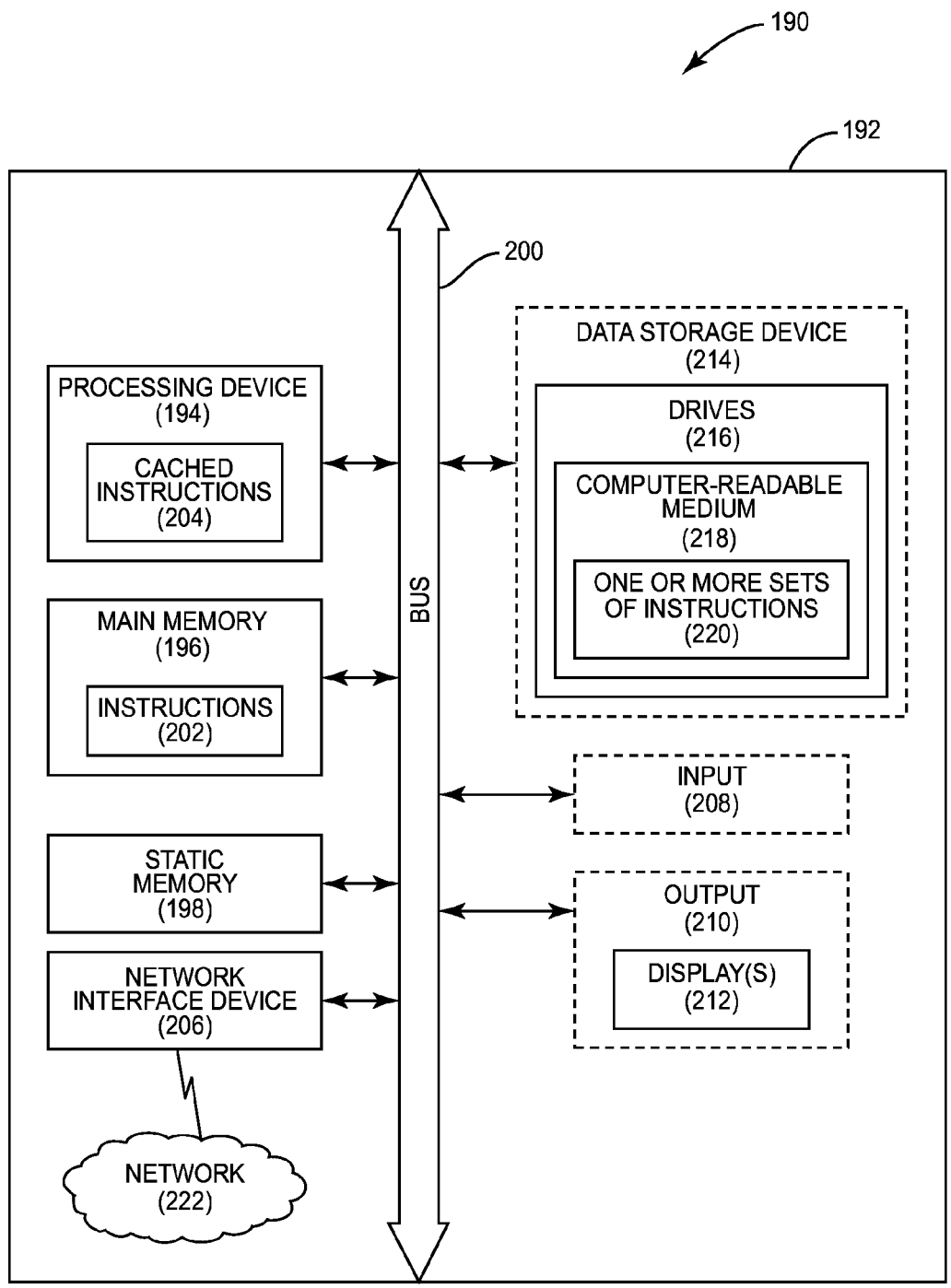
FIG. 9 is a schematic diagram representation of an exemplary processor-based system that can include the data resource service within the enterprise system in FIG. 2A and configured to execute instructions from an exemplary computer-readable medium to perform the functions described herein.

FIG. 9 provides a schematic diagram representation of a processing system 190 in the exemplary form of an exemplary computer system 192 adapted to execute instructions from an exemplary computer-readable medium to perform the functions described herein. In this regard, the processing system 190 may comprise the computer system 192 within which a set of instructions for causing the processing system 190 to perform any one or more of the methodologies discussed herein may be executed. The processing system 190 may be connected (as a non-limiting example, networked) to other machines in a local area network (LAN), an intranet, an extranet, or the Internet. The processing system 190 may operate in a client-server network environment, or as a peer machine in a peer-to-peer (or distributed) network environment. While only a single processing system 190 is illustrated, the terms "controller" and "server" shall also be taken to include any collection of machines that individually or jointly execute a set (or multiple sets) of instructions to perform any one or more of the methodologies discussed herein. The processing system 190 may be a server, a personal computer, a desktop computer, a laptop computer, a personal digital assistant (PDA), a computing pad, a mobile device, or any other device and may represent, as non-limiting examples, a server or a user's computer.

The exemplary computer system 192 includes a processing device or processor 194, a main memory 196 (as non-limiting examples, read-only memory (ROM), flash memory, dynamic random access memory (DRAM) such as synchronous DRAM (SDRAM), etc.), and a static memory 198 (as non-limiting examples, flash memory, static random access memory (SRAM), etc.), which may communicate with each other via a bus 200. Alternatively, the processing device 194 may be connected to the main memory 196 and/or the static memory 198 directly or via some other connectivity means.

The processing device 194 represents one or more processing devices such as a microprocessor, central processing unit, or the like. More particularly, the processing device 194 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 194 is configured to execute processing logic in instructions 202 and/or cached instructions 204 for performing the operations and steps discussed herein.

The computer system 192 may further include a communications interface in the form of a network interface device 206. It also may or may not include an input 208 to receive input and selections to be communicated to the computer system 192 when executing instructions. It also may or may not include an output 210, including but not limited to display(s) 212, a video display unit (as non-limiting examples, a liquid crystal display (LCD) or a cathode ray tube (CRT)), an alphanumeric input device (as a non-limiting example, a keyboard), a cursor control device (as a non-limiting example, a mouse), and/or a touch screen device (as a non-limiting example, a tablet input device or screen).

The computer system 192 may or may not include a data storage device 214 that includes using drive(s) 216 to store functions herein described in computer-readable medium 218 on which is stored one or more sets of instructions 220 (e.g., software) embodying any one or more of the methodologies or functions described herein. The one or more instructions 220 may also reside, completely or at least partially, within the main memory 196 and/or within the processing device 194 during execution thereof by the computer system 192, the main memory 196 and the processing device 194 also constituting machine-accessible storage media. The instructions 202, 204, and/or 220 may further be transmitted or received over a network 222 via the network interface device 206. The network 222 can be an intra-network or an inter-network.

While the computer-readable medium 218 is shown in an exemplary embodiment to be a single medium, the term "machine-accessible storage medium" should be taken to include a single medium or multiple media (as non-limiting examples, a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the embodiments disclosed herein. The term "machine-accessible storage medium" shall accordingly be taken to include, but not be limited to, solid-state memories, and optical and magnetic media.

Providing data resource services within enterprise systems for resource level sharing among multiple applications, and related methods, systems, and computer-readable media according to embodiments disclosed herein may be provided in or integrated into any processor-based device. Examples, without limitation, include a set top box, an entertainment unit, a navigation device, a communications device, a fixed location data unit, a mobile location data unit, a mobile phone, a cellular phone, an internet phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The arbiters, master devices, and slave devices described herein may be employed in any circuit, hardware component, integrated circuit (IC), or IC chip, as non-limiting examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a digital signal processor (DSP), an Application Specific Integrated Circuit (ASIC), an field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, as non-limiting examples, a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, as non-limiting examples, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. As non-limiting examples, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for providing a data resource service within an enterprise system for resource level sharing among multiple applications, comprising:
    maintaining, by a processor executing the data resource service, a single, centrally managed instance of a set of user data stored within the enterprise system, the set of user data comprising, at least in part, data received from a user;
    receiving, by the processor executing the data resource service, a request from a web application having application logic located outside of the enterprise system to access user data in the set of user data stored within the enterprise system;
    accessing, by the processor executing the data resource service, the requested user data in the set of user data stored within the enterprise system in response to the request from the web application;

reviewing, by the processor executing the data resource service, at least one access privilege associated with the set of user data;

providing, by the processor executing the data resource service, access to the requested user data in the set of user data stored within the enterprise system to the web application in response to the request while maintaining only the single, centrally managed instance of the set of user data stored within the enterprise system if the at least one access privilege associated with the set of user data allows the web application to access the set of user data;

not providing, by the processor executing the data resource service, access to the requested user data in the set of user data stored within the enterprise system to the web application in response to the request if the at least one access privilege associated with the set of user data does not allow the web application to access the set of user data;

receiving, by the processor executing the data resource service, a request from an enterprise application having logic within the enterprise system to access user data in the set of user data stored within the enterprise system;

accessing, by the processor executing the data resource service, the requested user data in the set of user data stored within the enterprise system in response to the request from the enterprise application; and providing, by the processor executing the data resource service, access to the requested user data in the set of user data stored within the enterprise system to the enterprise application in response to the request while maintaining only the single, centrally managed instance of the set of user data stored within the enterprise system.

2. The method of claim 1, further comprising:
receiving, by the data resource service, an update of user data in the set of user data stored within the enterprise system; and
storing, by the data resource service, the received update of user data in the single, centrally managed set of user data stored within the enterprise system.

3. The method of claim 2, further comprising:
notifying, by the data resource service, a plurality of subscribers to the set of user data of an update to the set of user data.

4. The method of claim 1, wherein the requested user data was created for a different web application than the web application providing the request.

5. The method of claim 1, further comprising accessing the set of user data stored within the enterprise system as a hierarchical resource via paths or Uniform Resource Locators (URLs) associated with the set of user data.

6. The method of claim 5, wherein the hierarchical resource is transient.

7. The method of claim 1, further comprising using a plurality of Web Real-Time Communications (WebRTC) applications, wherein each WebRTC application to functions as the web application.

8. The method of claim 1, further comprising using a plurality of widgets, wherein each widget comprises a collection of Hyper Text Markup Language (HTML), JavaScript, or Cascading Style Sheets code, and implements at least one web application.

9. The method of claim 8, further comprising using the plurality of widgets, wherein each widget interconnects to one or more of the remaining widgets in order to implement the at least one web application.

10. The method of claim 8, further comprising using the plurality of widgets, wherein each widget comprises a WebRTC widget.

11. The method of claim 8, wherein each widget further:
establishes a connection with the data resource service within the enterprise system;
requests access to the set of user data stored within the enterprise system;
accesses the set of user data stored within the enterprise system in response to the access request;
provides updates to the set of user data stored within the enterprise system; and
terminates the connection with the data resource service within the enterprise system.

12. A system for providing a data resource service within an enterprise system for resource level sharing among multiple applications, comprising:
a memory within an enterprise system that maintains a single, centrally managed instance of a set of user data within the enterprise system, the set of user data comprising, at least in part, data received from a user; and
a data resource server that:
receives a request from a web application having application logic located outside of the enterprise system to access user data in the set of user data stored within the enterprise system;
accesses the requested user data in the set of user data stored within the enterprise system in response to the request from the web application;
reviews at least one access privilege associated with the set of user data;
provides access to the requested user data in the set of user data stored within the enterprise system to the web application in response to the request while maintaining only the single, centrally managed instance of the set of user data stored within the enterprise system if the at least one access privilege associated with the set of user data allows the web application to access the set of user data;
not providing access to the requested user data in the set of user data stored within the enterprise system to the web application in response to the request if the at least one access privilege associated with the set of user data does not allow the web application to access the set of user data;
receives a request from an enterprise application having logic within the enterprise system to access user data in the set of user data stored within the enterprise system;
accesses the requested user data in the set of user data stored within the enterprise system in response to the request from the enterprise application; and
provides access to the requested user data in the set of user data stored within the enterprise system to the enterprise application in response to the request while maintaining only the single, centrally managed instance of the set of user data stored within the enterprise system.

13. The system of claim 12, wherein the data resource server further:
receives an update of user data in the set of user data stored within the enterprise system; and stores the received update of user data in the single, centrally managed set of user data stored within the enterprise system.

14. The system of claim 12, wherein the requested user data-was created for a different web application than the web application providing the request.

15. The system of claim 12, wherein the data resource server is further accesses the user data stored as a hierarchical resource via paths or Uniform Resource Locators (URLs) associated with the user data.

16. The system of claim 15, wherein the hierarchical resource is transient.

17. The system of claim 12, further comprising a plurality of Web Real-Time Communications (WebRTC) applications, wherein each WebRTC application functions as the web application.

18. The system of claim 12, further comprising a plurality of widgets, wherein each widget comprises a collection of Hyper Text Markup Language (HTML), JavaScript, and Cascading Style Sheets code, and implements at least one web application.

19. The system of claim 18, further comprising the plurality of widgets, wherein each widget interconnects to one or more of the remaining widgets in order to implement the at least one web application.

20. The system claim of 18, further comprising the plurality of widgets, wherein each widget comprises a WebRTC widget.

21. A non-transitory computer-readable medium storing one or more programs, the one or more programs comprising instructions, which when executed by an electronic device cause the electronic device to implement a method for providing a data resource service within an enterprise system for resource level sharing among multiple applications, the method comprising:

maintaining a single, centrally managed instance of a set of user data stored within the enterprise system, the set of user data comprising, at least in part, data received from a user;

receiving a request from a web application having application logic located outside of the enterprise system to access user data in the set of user data stored within the enterprise system;

accessing the requested user data in the set of user data stored within the enterprise system in response to the request from the web application;

reviewing at least one access privilege associated with the set of user data;

providing access to the requested user data in the set of user data stored within the enterprise system to the web application in response to the request while maintaining only the single, centrally managed instance of the set of user data stored within the enterprise system if the at least one access privilege associated with the set of user data allows the web application to access the set of user data;

not providing access to the requested user data in the set of user data stored within the enterprise system to the web application in response to the request if the at least one access privilege associated with the set of user data does not allow the web application to access the set of user data;

receiving a request from an enterprise application having logic within the enterprise system to access user data in the set of user data stored within the enterprise system;

accessing the requested user data in the set of user data stored within the enterprise system in response to the request from the enterprise application; and providing access to the requested user data in the set of user data stored within the enterprise system to the enterprise application in response to the request while maintaining only the single, centrally managed instance of the set of user data stored within the enterprise system.

22. The non-transitory computer-readable medium of claim 21, further comprising:

receiving an update of user data in the set of user data stored within the enterprise system; and storing the received update of user data in the single, centrally managed set of user data stored within the enterprise system.

23. The non-transitory computer-readable medium of claim 21, wherein the requested user data was created for a different web application than the web application providing the request.

* * * * *